(12) United States Patent
Chang et al.

(10) Patent No.: US 11,896,948 B2
(45) Date of Patent: Feb. 13, 2024

(54) SYNERGISTIC ZERO-VALENT IRON-BASED GREEN SORPTION MEDIA FOR CONTAMINANT REMOVAL

(71) Applicant: University of Central Florida Research Foundation, Inc., Orlando, FL (US)

(72) Inventors: Ni-Bin Chang, Orlando, FL (US); Debra Reinhart, Orlando, FL (US); A H M Anwar Sadmani, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/159,769

(22) Filed: Jan. 26, 2023

(65) Prior Publication Data
US 2023/0241575 A1 Aug. 3, 2023

Related U.S. Application Data

(60) Provisional application No. 63/267,406, filed on Feb. 1, 2022.

(51) Int. Cl.
*B01J 20/02* (2006.01)
*B01J 20/12* (2006.01)
(Continued)

(52) U.S. Cl.
CPC ......... *B01J 20/0229* (2013.01); *B01J 20/103* (2013.01); *B01J 20/12* (2013.01);
(Continued)

(58) Field of Classification Search
CPC ...... B01J 20/0229; B01J 20/103; B01J 20/12; C02F 1/288
See application file for complete search history.

(56) References Cited

U.S. PATENT DOCUMENTS

2015/0360987 A1* 12/2015 Bosisio .................. C02F 1/281
 210/219
2016/0031766 A1* 2/2016 Bezbaruah .............. C05B 17/00
 210/683
(Continued)

OTHER PUBLICATIONS

Chuyang Y. Tang et al. "Effect of solution chemistry on the adsorption of perfluorooctane sulfonate onto mineral surfaces" Water Research 44 (2010) 2654-2662.
(Continued)

*Primary Examiner* — Chester T Barry
(74) *Attorney, Agent, or Firm* — Smith & Hopen, P.A.; Paul Murty

(57) ABSTRACT

A synergistic composition can be used to treat water containing nitrogen compounds and phosphorus compounds. The synergistic composition includes iron filings, clay particles, aluminum particles, and sand particles. The iron filings, clay particles, and aluminum particles act synergistically to remove nitrogen compounds and phosphorus compounds from water. Specifically, the clay particles attract the nitrogen compounds and the phosphorus compounds to be absorbed onto a surface of the iron filings and the clay particles. The aluminum particles react with the nitrogen compounds via an oxidation reaction to form ammonia compounds, and react with the phosphorus compounds to produce aluminum phosphate. As such, the synergistic relationship between the iron filings, clay particles, and aluminum particles remove nitrogen and phosphorus compounds from water and recover the compounds in usable forms, namely, ammonia and aluminum phosphate.

7 Claims, 9 Drawing Sheets

(51) Int. Cl.
  *B01J 20/10* (2006.01)
  *C02F 1/28* (2023.01)
  *C02F 101/16* (2006.01)
  *C02F 101/36* (2006.01)
  *C02F 101/10* (2006.01)

(52) U.S. Cl.
  CPC .............. *C02F 1/288* (2013.01); *C02F 1/281* (2013.01); *C02F 2101/105* (2013.01); *C02F 2101/16* (2013.01); *C02F 2101/36* (2013.01); *C02F 2101/40* (2013.01)

(56) References Cited

U.S. PATENT DOCUMENTS

| | | | | |
|---|---|---|---|---|
| 2019/0336937 | A1* | 11/2019 | Clark | B01J 20/3078 |
| 2020/0179904 | A1* | 6/2020 | Hull | B01J 20/28021 |
| 2020/0239332 | A1* | 7/2020 | Kevern | B01D 39/06 |
| 2020/0368717 | A1* | 11/2020 | Donovan | B01J 20/3246 |
| 2022/0234906 | A1* | 7/2022 | Chen | C02F 1/288 |

OTHER PUBLICATIONS

Henry C. Thomas "Heterogeneous Ion Exchange in a Flowing System" Oct. 1944, Journal of the American Chemical Society, pp. 1664-1666 vol. 66.

Andrew Turner et al. "The Influence of Salting out on the Sorption of Neutral Organic Compounds in Estuaries" Wat. Res. vol. 35, No. 18, pp. 4379-4389, 2001.

Chinedu Josiah Umembamalu et al. "Packed bed column adsorption of oil and grease from refinery desalter effluent, using rice husks derived carbon as the adsorbent: Influence of process parameters and Bohart—Adams kinetics study" 2020 pp. 155-174. 31. World News of Natural Sciences.

USEPA (2019) Determination of Selected Perfluorinated Alkyl Acids in Drinking Water by Solid Phase Extraction and Liquid Chromatography/Tandem Mass Spectrometry (LC/MS/MS), EPA Method 537.Version 1.1. In: U.S. Environmental Protection Agency, editor.

USEPA (2016) Drinking Water Health Advisories for PFOA and PFOS. In: U.S. Environmental Protection Agency, editor.

Andrea Valencia et al. "Optimal Recipe Assessment of Iron Filing-Based Green Environmental Media for Improving Nutrient Removal in Stormwater Runoff" 2019 pp. 1323-1336. vol. 36, No. 10. Environmental Engineering Science.

Andrea Valencia et al. "Chemophysical Evaluation of Green Sorption Media for Copper Removal in Stormwater Runoff for Improving Ecosystem and Human Health" Water Air Soil Pollut (2019) 230: 2.

Henrik Viberg et al. "Perfluorooctane Sulfonate and Perfluorooctanoic Acid" 2017 pp. 811-827.Chapter 43. Reproductive and Developmental Toxicology.

Carola Wagner et al. "Cyanobacteria dominance: Quantifying the effects of climate change" Limnology and Oceanography, Nov., 2009, vol. 54, No. 6, Part 2. Lakes and Reservoirs as Sentinels, Integrators, and Regulators of Climate Change pp. 2460-2468.

Fei Wang et al. "Influence of calcium hydroxide on the fate of perfluorooctanesulfonate under thermal conditions" Journal of Hazardous Materials 192 (2011) 1067-1071.

Song-Thao Le et al. "A group-contributionmodel for predicting the physicochemical behavior of PFAS components for understanding environmental fate" Science of the Total Environment 764 (2021) 142882.

Maxim S. Kovalev et al. "A robust algorithm for explaining unreliable machine learning survival models using the Kolmogorov-Smirnov bounds" Neural Networks 132 (2020) 1-18.

Lingling Liu et al. (2019) Application of nanotechnology in the removal of heavy metal from water. Nanomaterials for the removal of pollutants and resource reutilization. Elsevier, pp. 83-147, edited by Xubiao Luo Fang Deng, Elsevier, Amsterdam, Netherlands.

Khim Hoong Chu "Fixed bed sorption: Setting the record straight on the Bohart-Adams and Thomas models" Journal of Hazardous Materials 177 (2010) 1006-1012.

Khim Hoong Chu et al. "Batch Kinetics of Metal Biosorption: Application of the Bohart-Adams Rate Law" Separation Science and Technology. 2011 pp. 1591-1601.

Khim Hoong Chu et al. "Breakthrough curve analysis by simplistic models of fixed bed adsorption: In defense of the century-old Bohart-Adams model" Chemical Engineering Journal 380 (2020) 122513.

M. Clara et al. "Perfluorinated alkylated substances in the aquatic environment: An Austrian case study" Water Research 43 (2009) pp. 4760-4768.

Young-Min Lee et al. "Concentration and distribution of per- and polyfluoroalkyl substances (PFAS) in the Asan Lake area of South Korea" Journal of Hazardous Materials 381 (2020) 120909.

J. C. Crittenden et al. "Transport of Organic Compounds With Saturated Groundwater Flow: Model Development and Parameter Sensitivity" Mar. 1986 pp. 271-284. vol. 22, No. 3. Water Resources Research.

Danni Cui et al. "Occurrence, fate, sources and toxicity of PFAS: What we know so far in Florida and major gaps" Trends in Analytical Chemistry 130 (2020) 115976.

J.G. Davis et al. "Choosing a Soil Amendment" 2013. pp. 1-3. Fact Sheet No. 7.235. Gardening Series|Basics Extension. Colorado.

Shubo Deng et al. "Removal of perfluorooctane sulfonate from wastewater by anion exchange resins: Effects of resin properties and solution chemistry" Water Research 44 (2010) 5188-5195.

Dragana Keselj et al. "Determination of Alumina Oxide in Bauxites by X-Ray Fluorescence Analysis" Global Journal of Science Frontier Research Chemistry. 2012, pp. 1-7. vol. 12 Issue 3.

L. Diels et al. "Heavy metals removal by sand filters inoculated with metal sorbing and precipitating bacteria" Hydrometallurgy. 2003 pp. 235-241. 71.

Dominik Leutnart et al. "Distribution-Based Calibration of a Stormwater Quality Model" Water. 2018 pp. 1-14. 10, 1027.

Fuhar Dixit et al. "PFAS removal by ion exchange resins: A review" Chemosphere 272 (2021) 129777.

Ziwen Du et al. "Removal of perfluorinated carboxylates from washing wastewater of perfluorooctanesulfonyl fluoride using activated carbons and resins" Journal of Hazardous Materials 286 (2015) 136-143.

A. Jones et al. "Evaluating the role of soluble aluminum in manganese removal via MnOx(s)-coated filtration media in drinking water treatment" Water Research 111 (2017) 59-65.

Christina R. Keenan et al. "Factors Affecting the Yield of Oxidants from the Reaction of Nanoparticulate Zero-Valent Iron and Oxygen" Environ. Sci. Technol. 2008, 42, 1262-1267.

Erica Gagliano et al. "Removal of poly- and perfluoroalkyl substances (PFAS) from water by adsorption: Role of PFAS chain length, effect of organic matter and challenges in adsorbent regeneration" Water Research 171 (2020) 115381.

Azam Ghorbani et al. "Recovery of Al2O3, Fe2O3 and TiO2 from Bauxite Processing Waste (Red Mud) by Using Combination of Different Acids" 2J. Basic. Appl. Sci. Res., 3(1s)187-191, 2013.

Juliane Gluge et al. "An overview of the uses of per- and polyfluoroalkyl substances (PFAS)†" Environ. Sci.: Processes Impacts, 2020, 22, 2345.

Zailin Gong et al. "Self-flocculated powdered activated carbon with different oxidation methods and their influence on adsorption behavior Zailin" Journal of Hazardous Materials 304 (2016) 222-232.

Martín E. González-López et al. "A Critical Overview of Adsorption Models Linearization: Methodological and Statistical Inconsistencies" Separation & Purification Reviews. pp. 358-372. vol. 51, No. 3.

Lauren F. Greenlee et al. "Kinetics of Zero Valent Iron Nanoparticle Oxidation in Oxygenated Water" Environmental Science & Technology. 2012 pp. 12913-12920. 46.

B. Gullet et al. "Per- and Polyfluoroalkyl Substances (PFAS): Incineration to Manage PFAS Waste Streams" 2020 Technical BRIEF Innovative Research for a Sustainable Future.

(56) References Cited

OTHER PUBLICATIONS

M.A. Hashim et al. "Prediction of protein breakthrough behavior using simplified analytical solutions" Separation and Purification Technology 2007 pp. 189-197.53.

Maja S. Hellsing et al. "Sorption of perfluoroalkyl substances to two types of minerals" Chemosphere 159 (2016) 385-391.

Emily Hepburn et al. "Contamination of groundwater with per- and polyfluoroalkyl substances (PFAS) from legacy andfills in an urban re-development precinct" Environmental Pollution 248 (2019) 101-113.

Hisao Hori et al. "Decomposition of Environmentally Persistent Perfluorooctanoic Acid in Water by Photochemical Approaches" Environ. Sci. Technol. 2004, 38, 6118-6124.

Tisao Hori et al. "Efficient Decomposition of Environmentally Persistent Perfluorocarboxylic Acids by Use of Persulfate as a Photochemical Oxidant" Environ. Sci. Technol. 2005, 39, 2383-2388.

Hisao Hori et al. "Photochemical decomposition of environmentally persistent short-chain perfluorocarboxylic acids in water mediated by iron(II)/(III) redox reactions" Chemosphere. 2007 pp. 572-578. 68.

Qili Hu et al. Modification of breakthrough models in a continuous-flow fixed-bed column: Mathematical characteristics of breakthrough curves and rate profiles Separation and Purification Technology 238 (2020) 116399.

"PFAS Pollution Across the Middle East and Asia" IPEN, 2019. pp. 1-15.

Allan Astrup Jensen et al."Emerging endocrine disrupters: perfluoroalkylated substances" International Journal of Andrology. 2008 pp. 161-169.31.

Junho Jeon et al. "Effects of salinity and organic matter on the partitioning of perfluoroalkyl acid (PFAs) to clay particles" Journal of Environmental Monitoring. 2011 pp. 1803-1810.13.

Shanxue Jiang et al. "A review of reverse osmosis membrane fouling and control strategies" Science of the Total Environment 595 (2017) 567-583.

Katarzyna H. Kucharzyk et al. "Novel treatment technologies for PFAS compounds: A critical review" Journal of Environmental Management 204 (2017) 757-764.

Sung Hee Joo et al. "Oxidative Degradation of the Carbothioate Herbicide, Molinate, Using Nanoscale Zero-Valent Iron" Environ. Sci. Technol. 2004, 38, 2242-2247.

Manish Kumar et al."Priority and emerging pollutants in water" 2020 Inorganic Pollutants in Water. Elsevier, pp. 33-49.

Jia Liu et al. "Removal of PFOA in groundwater by Fe0 and MnO2 nanoparticles under visible light" Journal of Environmental Science and Health, Part A. 2017, pp. 1048-1054. vol. 52, No. 11.

Minhee Kim et al. "Selecting reliable physicochemical properties of perfluoroalkyl andpolyfluoroalkyl substances (PFASs) based on molecular descriptors" Environmental Pollution 196 (2015) 462-472.

Srishti Verma et al. "Slow sand filtration for water and wastewater treatment—a review" 2017, Environmental Technology Reviews, 6:1, 47-58.

John R. Lanzante "Testing for differences between two distributions in the presence of serial correlation using the Kolmogorov—Smirnov and Kuiper's tests" Int J Climatol. 2021 pp. 1-10.

Ramona L. Johnson et al. "The Adsorption of Perfluorooctane Sulfonate onto Sand, Clay, and Iron Oxide Surfaces" J. Chem. Eng. Data 2007, 52, 1165-1170.

Raul H.C. Lopes et al. "The two-dimensional Kolmogorov-Smirnov test" 2007 pp. 1-11. Proceedings of Science. Amsterdam, the Netherlands.

Seung-Kyu Kim et al., "Perfluorinated Acids in Air, Rain, Snow, Surface Runoff, and Lakes: Relative Importance of Pathways to Contamination of Urban Lakes" Environ. Sci. Technol. 2007, 41, 8328-8334.

Tarek M. Abdel-Fattah et al. "Quantitative Analysis of X-ray Fluorescence Absorption and Emission for Thickness Determination of ALD-Grown Metal and Oxide Nanoscaled Films" Journal of Nanoscience and Nanotechnology. 2017 pp. 5745-5750 vol. 17.Norfolk, Virginia.

Atefeh Abdolali et al. "Application of a breakthrough biosorbent for removing heavy metalsfrom synthetic and real wastewaters in a lab-scale continuous fixed-bed column" 2017, Bioresource technology 229, 78-87.

M. Achak et al. "Removal of organic pollutants and nutrients from olive mill wastewater by a sand filter" Journal of Environmental Management. 2009 pp. 2771-2779, 90.Marrakech, Morocco.

Yousof H. Aly et al. In Situ Remediation Method for Enhanced Sorption of Perfluoro-Alkyl Substances onto Ottawa Sand J. Environ. Eng., 2018, 144(9): 04018086.

Timothy D. Appleman et al. "Nanofiltration and granular activated carbon treatment of perfluoroalkyl acids" Journal of Hazardous Materials, pp. 740-746. 260. 2013.USA.

Muhammad Aslam "Introducing Kolmogorov-Smirnov Tests under Uncertainty: An Application to Radioactive Data" ACS Omega 2020, 5, 914-917.

Nadine Belkouteb et al. "Removal of per- and polyfluoroalkyl substances (PFASs) in a full-scale drinking water treatment plant: Long-term performance of granular activated carbon (GAC) and influence of flow-rate" Water Research 182 (2020) 115913.

Anthony M. T. Bell et al. "X-ray Fluorescence Analysis of Feldspars and Silicate Glass:Effects of Melting Time on Fused Bead Consistency and Volatilisation" Minerals 2020, 10, 442; doi:10.3390/min10050442.

Athanasios Besis et al. "Perfluoroalkyl substances (PFASs) in air-conditioner filter dust of indoor microenvironments in Greece: Implications for exposure" Ecotoxicology and Environmental Safety 183 (2019) 109559.

Satyendra P. Bhavsar et al. "High levels, partitioning and fish consumption based water guidelines of perfluoroalkyl acids downstream of a former firefighting training facility in Canada" journal 2016. pp. 415-423. 94. Environment International, Canada.

G. S. Bohart et al. "Some Aspects of the Behavior of Charcoal With Respect to Chlorine." May 1920. U.S. Bureau of Chemistry Notes, p. 669.

J. Scott Boone et al. "Per- and polyfluoroalkyl substances in source and treated drinking waters of the United States" Science of the Total Environment 653 (2019) 359-369.

Rossana Bossi et al. "Perfluorinated alkyl substances (PFAS) in terrestrial environments in Greenland and Faroe Islands" Chemosphere 129 (2015) 164-169.

Adam Brewer et al. "The Mobility of Plastic Nanoparticles in Aqueous and Soil Environments: A Critical Review" 2021 ACS EST Water, 1(1), 48-57.

Thomas A. Bruton et al. "Proposal for coordinated health research in PFAS-contaminated communities in the United States" Environmental Health (2017) 16:120.

Ni-Bin Chang et al. "New Performance-Based Passive Septic Tank Underground Drainfield for Nutrient and Pathogen Removal Using Sorption Media" Environmental Engineering Science. 2010, pp. 469-482. vol. 27, No. 6.

Ni-Bin Chang et al. "The Impact of Carbon Source as Electron Donor on Composition and Concentration of Dissolved Organic Nitrogen in Biosorption- Activated Media for Stormwater and Groundwater Co-Treatment" Environmental Science & Technology, 2018, pp. 9380-9390.

Huiting Chen et al. "Characterization of occurrence, sources and sinks of perfluoroalkyl and polyfluoroalkyl substances (PFASs) in a tropical urban catchment" Environmental Pollution 227 (2017) 397-405.

Beverly S. Chittoo et al. "Column breakthrough studies for the removal and recovery of phosphate by lime-iron sludge: Modeling and optimization using artificial neural network and adaptive neuro-fuzzy inference system" Chinese Journal of Chemical Engineering 28 (2020) 1847-1859.

Chowdhury et al. "Evaluating Design Parameters for Breakthrough Curve Analysis and Kinetics of Fixed Bed Columns for Cull Cations Using Lignocellulosic Wastes" Chinese Journal of Chemical Engineering 28 (2020) 1847-1859.

(56) References Cited

OTHER PUBLICATIONS

Florida Department of Environmental Protection "Per- and Polyfluoroalkyl Substances (PFAS)Dynamic Plan" Mar. 2022, pp. 1-22.
Alfredo José Barreto Luiz et al. "Application of the Kolmogorov-Smirnov Test to Compare Greenhouse Gas Emissions Over Time" Revista Brasileira De Biometria. 2021, pp. 60-70 vol. 39.
Teresa F. Mastropietro et al. "Reverse Osmosis and Nanofiltration membranes for highly efficient PFASs removal: overview, challenges and future perspectives" Dalton Transactions 2021, 50(16), 5398-5410.
Victor Matamoros et al. "Removal of Pharmaceuticals and Personal Care Products (PPCPs) from Urban Wastewater in a Pilot Vertical Flow Constructed Wetland and a Sand Filter" Environ. Sci. Technol. 2007, 41, 8171-8177.
Simon Morr et al. "How Much Calcium Is in Your Drinking Water? A Survey of Calcium Concentrations in Bottled and Tap Water and Their Significance for Medical Treatment and Drug Administration" HSSJ (2006) 2: 130-135.
Conner C. Murray et al "Removal of per- and polyfluoroalkyl substances using super-fine powder activated carbon and ceramic membrane filtration" Journal of Hazardous Materials 366 (2019) 160-168.
"Perfluoroalkyl and Polyfluoroalkyl Substances (PFAS)" National Institute of Environmental Health Sciences 2018.
Andrew M. O'Reilly "Nutrient removal using biosorption activated media: Preliminary biogeochemical assessment of an Innovative stormwater infiltration basin" Science of the Total Environment 432 (2012) 227-242.
Valeria Ochoa-Herrera et al. "Removal of perfluorinated surfactants by sorption onto granular activated carbon, zeolite and sludge" Chemosphere 72 (2008) 1588-1593.
Diana Ordonez et al. "Synergistic effects of aluminum/iron oxides and clay minerals on nutrient removal and recovery in water filtration media" Journal of Cleaner Production 275 (2020) 122728.
Akshay Chandrashekar Parenky et al. "Removal of Perfluorooctanesulfonic Acid in Water by Combining Zerovalent Iron Particles with Common Oxidants" 2020, pp. 472-481, vol. 37, No. 7, Environmental Engineering Science.
Park, Minkyu et al. "Adsorption of perfluoroalkyl substances (PFAS) in groundwater by granular activated carbons : roles of hydrophobicity of PFAS and carbon characteristics" 2020, Water Research, 170, 115364-.https://dx.doi.org/10.1016/j.watres.2019.115364.
Saerom Park et al. "Perfluorooctane sulfonate (PFOS) removal with Pd0/nFe0 nanoparticles: Adsorption or aqueous e-complexation,not transformation?" Journal of Hazardous Materials 342 (2018) 20-28.
Himanshu Patel "Fixed-bed column adsorption study: a comprehensive review" Applied Water Science (2019) 9:45.
Valerie J Paul "Global warming and cyanobacterial harmful algal blooms" In: Hudnell H.K. (eds) Cyanobacterial Harmful Algal Blooms: State of the Science and Research Needs. Advances in Experimental Medicine and Biology, vol. 619, pp. 240-257.
Aditi Podder et al. "Per and poly-fluoroalkyl substances (PFAS) as a contaminant of emerging concern in surface water: A transboundary review of their occurrences and toxicity effects" Journal of Hazardous Materials 419 (2021) 126361.
Gloria B.Post et al. "Perfluorooctanoicacid(PFOA),an emerging drinking water contaminant: A critical review of recent iterature" Environmental Research116(2012)93-117.
Yaşar K. Recepoğlu et al. "Packed bed column dynamic study for boron removal from geothermal brine by a chelating fiber and breakthrough curve analysis by using mathematical models" Desalination 437 (2018) 1-6.
Ande Rostvall et al. "Removal of pharmaceuticals, perfluoroalkyl substances and other micropollutants from wastewater using lignite, Xylit, sand, granular activated carbon (GAC) and GAC+Polonite® in column tests—Role of physicochemical properties" Water Research 137 (2018) 97-106.
A.H.M. Anwar Sadmani et al."Rejection of pharmaceutically active and endocrine disrupting compounds by hanofiltration as a function of source water humic substances" Journal of Water Process Engineering 2 (2014) 63-70.
Rindang Kembar Sari "Analysis of oxide content in sand and rock found in public mining of west sumatra province using XRF test" 2019 J. Phys.: Conf. Ser. 1317 012055.
Erika Schedin "Effect of organic carbon, black carbon, calcium ions and aging on the sorption of per- and polyfluoroalkylated substances (PFASs) to soil" Dec. 2013, Department of Aquatic Sciences and Assessment at the Swedish University of Agricultural Sciences. Master in Environmental and Aquatic Civil Engineering. Uppsala University, pp. 57.
Paul Scicchitano "Toxic PFAS Chemical Found in Florida—Here's Where" May 13, 2019. pp. 1-19. Patch, Miami FL.
Devi Shanmugam et al. "Bench-scale packed bed sorption of Cibacron blue F3GA using lucrative algal biomass" Alexandria Engineering Journal (2016) 55, 2995-3003.
John A. Simon et al. "PFAS Experts Symposium: Statements on regulatory policy, chemistry and analytics, toxicology, transport/fate, and remediation for per- and polyfluoroalkyl substances (PFAS) contamination issues" Remediation. 2019,29:31-48.
Esra Bilgin Simsek et al. "Predicting the dynamics and performance of selective polymeric resins in a fixed bed system for boron removal" Desalination 349 (2014) 39-50.
Alpana Singh et al. "Continuous metal removal from solution and industrial effluents using Spirogyra biomass-packed column reactor" Water Research, 2012 pp. 779-788. 46.
N. Smirnov "Table for estimating the goodness of fit of Empirical distributions" 1948 The Annals of Mathematical Statistics 19:279-281.
Mattias Sörengård et al. "Adsorption behavior of per- and polyfluoroalkyl substances (PFASs) to 44 inorganic and organic sorbents and use of dyes as proxies for PFAS sorption" Journal of Environmental Chemical Engineering 8 (2020) 103744.
Tasha Stoiber et al. "Disposal of products and materials containing per- and polyfluoroalkyl substances (PFAS): A cyclical problem" Chemosphere 260 (2020) 127659.

\* cited by examiner

SYNERGISTIC ZERO-VALENT IRON-BASED GREEN SORPTION MEDIA FOR CONTAMINANT REMOVAL

CROSS-REFERENCE TO RELATED APPLICATIONS

This nonprovisional application claims priority to provisional application No. 63/267,406, entitled "Synergistic zero-valent iron-based green sorption media for contaminant removal," filed on Feb. 1, 2022, by the same inventors.

BACKGROUND OF THE INVENTION

1. Field of the Invention

This invention relates, generally, to media used to improve efficiencies of contaminant removal from fluids, such as water sources. More specifically, it relates to a synergistic zero-valent iron-based filtration composition that is used to remove contaminants, including perfluorooctane sulfonic acid (PFOS) and perfluorooctanoic acid (PFOA), from fluid.

2. Brief Description of the Prior Art

Per- and polyfluoroalkyl substances (PFAS) belong to a class of anthropogenic chemicals that have been in the limelight as contaminants of emerging concern (CEC) due to adverse ecological and human health effects (Kumar et al. 2020, Podder et al. 2021). PFAS have been widely used around the globe since the 1940s, particularly within the manufacturing industry to create water-resistant, stain-resistant, and non-stick commercial products. These products include coatings on food packaging, carpets, outdoor clothing and textile fabrics, leather goods, cosmetics and personal care products, ski and snowboard waxes, and firefighting foams. With the invention of new forms of PFAS, the current inventory of more than 4,700 PFAS is likely to continue to grow (NIH 2021).

While PFAS have characteristics that make them attractive for use in manufacturing certain products, the use of PFAS is associated with environmental and health-related risks. For example, PFAS are persistent in the environment due to their high thermal and chemical stability, attributable to their highly polar and strong carbon-fluorine bonds. As a result, PFAS have been detected in air, water, and soil environments, as well as in effluents of treated wastewater, increasing the potential for human intake via various routes (Besis et al. 2019, Lee et al. 2020). Results have shown that PFAS may pose negative impacts on the endocrine systems, affecting the thyroid, sex hormone levels (e.g., low testosterone), and estradiol levels (e.g., increasing estradiol levels). PFAS have been linked to kidney and testicular cancer, as well as pregnancy-induced hypertension and birth weight issues (Post et al. 2012). In some animal studies, it was found that the exposure to PFAS could affect mammary gland development, accelerate puberty, and impair the development of the fetus (Bruton and Blum 2017). The toxicity of PFAS increases with chain length, raising the concern with long-chain PFAS (containing more than six fluorinated carbon atoms).

In an attempt to mitigate health risks associated with perfluorooctanoic acid (PFOA) ($C_8HF_{15}O_2$) and perfluorooctane sulfonic acid (PFOS) ($C_8HF_{17}O_3S$)—the most widely used PFAS—the United States Environmental Protection Agency (USEPA) previously established a health advisory level of 70 parts per trillion (ppt) for combined PFOA and PFOS (USEPA 2016). In addition, some states have adopted stricter regulations than the USEPA advisory limit. For example, California has proposed an interim notification level of 14 ppt and 13 ppt for PFOA and PFOS, respectively for drinking water. New Jersey has adopted a Maximum Contaminant Level for perfluorononanoic acid (PFNA) of 13 ppt (Simon et al. 2019). In October 2021, USEPA announced that the Agency is developing a national PFAS testing strategy that intends to use its Toxic Substances Control Act authorities to require PFAS manufacturers to provide information on PFAS.

While conventional water treatment processes are not designed to remove PFAS, other innovative technologies including oxidation-reduction, volatilization, microbial and metabolic degradations, in addition to photolytic, electrochemical, and sonochemical methods (Kucharzyk et al. 2017), have been tested. These technologies can be costly, and hence, recent studies on PFAS removal have focused on phase separation processes, including sorption, ion exchange, or sequestration when treating PFAS-laden water (Simon et al. 2019).

While these treatment technologies are currently being used, further investigations must address the management of PFAS-concentrated wastes through landfilling or incineration that result in a cyclical problem. For example, PFAS are not destroyed during landfilling; instead, they pose risks of further environmental transmission.

Furthermore, the incineration of PFAS can result in the airborne release of harmful chemicals, including fluorinated greenhouse gases and non-combusted PFAS that can be transported to water and soil (Stoiber et al. 2020), further contributing to the cyclical issue of PFAS contamination.

Membrane processes can effectively treat PFAS in various source waters (Mastropietro et al. 2021, Olimattel et al. 2021); however, membrane treatment is energy-intensive and prone to fouling issues that reduce membrane productivity (Jiang et al. 2017, Sadmani et al. 2014). Granular activated carbon (GAC) adsorption is an effective technology to treat PFAS in drinking water sources. A recent study (Sörengård et al. 2020) examined the removal of PFAS via 44 organic and inorganic sorbents, concluding that GAC or powdered activated carbons (PAC) are the best sorbents for removing PFAS. GAC is more efficient in treating long-chain PFAS compared to short chain PFAS (Murray et al. 2019), and PAC is more efficient than GAC in PFAS removal because of its higher surface area. However, the limitations associated with GAC/PAC include the high cost of treatment, especially the expense of media regeneration upon exhaustion, and the disposal of PFAS-rich regenerant waste and spent media (Belkouteb et al. 2020, Dixit et al. 2021).

Accordingly, what is needed is an efficient and cost-effective synergistic sorption media including recyclable materials to promote the sustainable removal of hazardous materials (such as per- and polyfluoroalkyl substances) from fluid. However, in view of the art considered as a whole at the time the present invention was made, it was not obvious to those of ordinary skill in the field of this invention as to how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas.

Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an efficient, cost-effective, iron-based composition used to remove contaminants (such as per- and polyfluoroalkyl substances) from fluid is now met by a new, useful, and nonobvious invention.

The novel synergistic composition for treating water containing one or more per- and polyfluoroalkyl substances includes a mixture of zero-valent iron particles, clay particles, and sand particles. In an embodiment, the composition includes approximately 5% (v/v) zero-valent iron particles, approximately 4% (v/v) clay particles, and approximately 91% (v/v) sand particles. In an embodiment, the composition includes at most 5% (v/v) zero-valent iron particles. In an embodiment, the zero-valent iron particles are in a powder format. In an embodiment, the one or more per- and polyfluoroalkyl substances is selected from the group consisting of perfluorooctane sulfonic acid and perfluorooctanoic acid.

The zero-valent iron particles are configured to break down chains of the one or more per- and polyfluoroalkyl substances into shorter chains via a chemical oxidation reaction, thereby promoting adsorption of the shorter chains of the one or more per- and polyfluoroalkyl substances by hydrophilic films surrounding the zero-valent iron particles, and thereby removing a portion of the one or more per- and polyfluoroalkyl substances from the water. The zero-valent iron particles and the clay particles are configured to synergistically promote adsorption of the one or more per- and polyfluoroalkyl substances through electrostatic interactions, thereby removing a portion of the one or more per- and polyfluoroalkyl substances.

In an embodiment, the synergistic composition is included in a novel filtration system for treating water containing one or more per- and polyfluoroalkyl substances. The filtration system includes a media chamber including a homogenously mixed synergistic composition. The homogenously mixed synergistic composition includes a mixture of zero-valent iron particles, clay particles, and sand particles. In an embodiment, the homogenously mixed synergistic composition includes approximately 5% (v/v) zero-valent iron particles, approximately 4% (v/v) clay particles, and approximately 91% (v/v) sand particles. In an embodiment, the homogenously mixed synergistic composition includes at most 5% (v/v) zero-valent iron particles.

A method of treating water containing one or more per- and polyfluoroalkyl substances includes a step of mixing together a synergistic composition of zero-valent iron particles, clay particles, and sand particles. The synergistic composition is applied to an amount of water containing one or more per- and polyfluoroalkyl substances, thereby creating an aqueous solution. The zero-valent iron particles oxidize the one or more per- and polyfluoroalkyl substances of the aqueous solution, thereby breaking a chain of the one or more per- and polyfluoroalkyl substances into a plurality of shorter chains. A hydrophilic firm surrounding the zero-valent iron particles adsorbs an amount of the one or more per- and polyfluoroalkyl substances of the plurality of shorter chains. The zero-valent iron particles and the clay particles electrostatically adsorb an amount of the one or more per- and polyfluoroalkyl substances of the plurality of shorter chains. As such, the zero-valent iron particles, the clay particles, and the sand particles synergistically remove the one or more per- and polyfluoroalkyl substances from the water.

In an embodiment, the synergistic composition includes at most 5% (v/v) zero-valent iron particles. In an embodiment, the synergistic composition includes approximately 4% (v/v) clay particles. In an embodiment, the synergistic composition includes approximately 91% (v/v) sand particles. In an embodiment, the synergistic composition includes at most 5% (v/v) zero-valent iron particles, approximately 4% (v/v) clay particles, and approximately 91% (v/v) sand particles. In an embodiment, the zero-valent iron particles are in a powder format. In an embodiment, the one or more per- and polyfluoroalkyl substances is selected from the group consisting of perfluorooctane sulfonic acid and perfluorooctanoic acid.

An object of the invention is to improve the removal of per- and polyfluoroalkyl substances, such as perfluorooctane sulfonic acid (PFOS) and perfluorooctanoic acid (PFOA), from fluid, thereby mitigating the hazardous long-term environmental and health-related effects of per- and polyfluoroalkyl substances.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
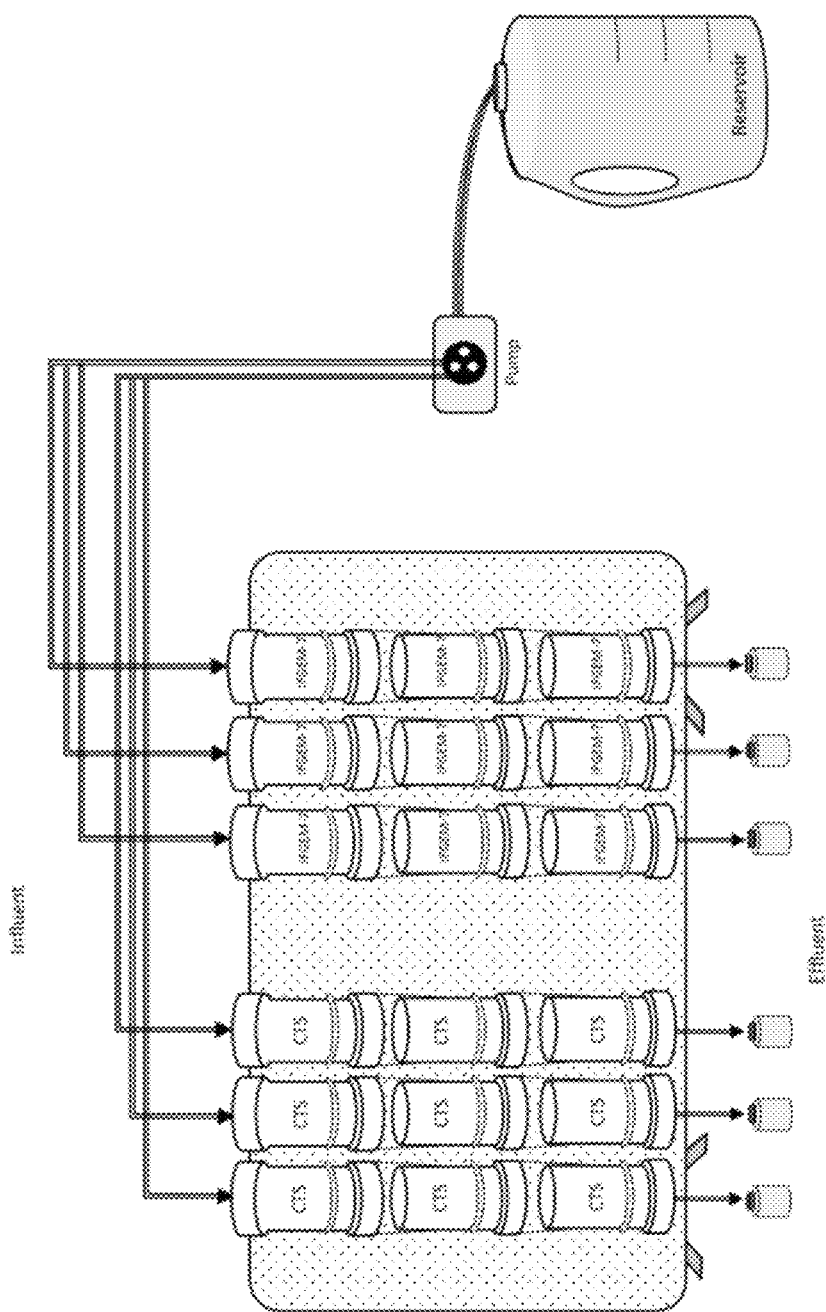
FIG. 1 depicts an embodiment of an experimental set up designed to test a contaminant removal efficiency and efficacy of a control media (labeled as CTS) compared with a test media (labeled as IFGEM-7), in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise. All numerical designations, such as pH, temperature, time, concentration, and molecular weight, including ranges, are approximations which are varied up or down by increments of 1.0 or 0.1, as appropriate. It is to be understood, even if it is not always explicitly stated that all numerical designations are preceded by the term "about." As used herein, "about," "approximately," or "substantially" refer to being within an acceptable error range for the particular value as determined by one of ordinary skill in the art, which will depend in part on how the value is measured or determined. As used herein, the terms "about," "approximately," and "substantially" refer to ±10% of the numerical; it should be understood that a numerical including an associated range with a lower boundary of greater than zero must be a non-zero numerical, and the terms "about," "approximately," and "substantially" should be understood to include only non-zero values in such scenarios.

The present invention includes a synergistic, efficient, and eco-friendly composition of recycled materials that can be used to treat an amount of fluid, such as water, to remove contaminants therefrom. In particular, the present invention includes a synergistic composition (referred to herein as IFGEM-7, or iron filings-based green environmental media 7) including zero-valent iron (ZVI), clay, and sand that is used to remove per- and polyfluoroalkyl substances (PFAS), such as perfluorooctane sulfonic acid (PFOS) and perfluorooctanoic acid (PFOA), from fluid, such as water. The synergistic composition is capable of treating aqueous solutions including PFAS due to the combined electrostatic, hydrophobic, and hydrophilic interactions between the components of the composition and the contaminants. Moreover, the use of ZVI further reduces a concentration of PFAS within the aqueous solution due to chemical oxidation and adsorption of the PFAS by the ZVI components of the composition, leading to a greater adsorption capacity of the IFGEM-7 composition. The composition and methods of removing PFAS from an amount of fluid will be described in greater detail in the sections herein below.

In an embodiment, the IFGEM-7 composition includes at most approximately 5% (v/v) ZVI, approximately 4% (v/v) clay, and approximately 91% (v/v) sand. The synergistic composition includes sand and iron, which together remove PFAS via adsorption. However, the IFGEM-7 composition includes recycled ZVI particles, which are more sustainable and cost-effective when compared to other filtration media such as iron oxide coated sand (Johnson et al. 2007) or other nanoparticles (Liu et al. 2017). In addition, the recycled ZVI particles contribute to additional PFAS removal due to electrostatic interaction between PFAS functional groups and iron oxides via sorption, as will be described in greater detail below (Wang et al. 2021).

Moreover, IFGEM-7 has an increased density of approximately 2.72 g cm$^{-3}$, which is much higher than sand, due to the inclusion of ZVI powder in the synergistic composition. According to the United States Department of Agriculture, soils with about 50% pore space and density of 1.33 g cm$^{-3}$ are classified as silt loam soil and the density of natural sand is 1.71 g·cm$^{-3}$ (NRCS 2021). In performed experiments (described in greater detail in the sections below), the synergistic IFGEM-7 composition exhibits improved results relating to the removal of PFAS compared with a control composition (referred to herein as CTS), which includes approximately 5% (v/v) clay, approximately 10% (v/v) tire crumb, and approximately 85% (v/v) sand. The characteristics of IFGEM-7 and of CTS are described in Table 1.

TABLE 1

Composition and characterization of filtration media.

| Name | Media Matrix | BET Surface Area (m$^2$ · g$^{-1}$) | Density (g · cm$^{-3}$) | Porosity (%) | Saturated Hydraulic conductivity (cm s$^{-1}$) | Hydraulic Retention Time (h) | Reference |
|---|---|---|---|---|---|---|---|
| CTS | 85% sand, 10% tire crumb and 5% clay by volume | 0.86 | 2.40 | 40.10 | 0.026 | 7.11 | Wen et al. (2020) |
| IFGEM-7 | 91% sand, 5% ZVI and 4% clay by volume | 3.11 | 2.72 | 29.19 | 0.013 | 7.5 | Present Invention |

Overall, IFGEM-7 performs well due to the presence of ZVI; having a larger surface area as compared with to other filtration media (including CTS); having a smaller porosity as compared with other filtration media (including CTS), while retaining a similar hydraulic retention time (HRT); and having a smaller hydraulic conductivity as compared with other filtration media (including CTS). Each of these characteristics contribute to PFAS removal via a unique physicochemical process, described in detail below.

In use, the components of the IFGEM-7 composition synergistically act to remove PFAS from an aqueous solution. In particular, the main component of IFGEM-7 (and of the control media, CTS) is sand, which is a commonly-used soil amendment due to its ability to retain water for prolonged periods of time. Used alone, sand has been shown to remove an average of 28% of PFAS from a given area, with the sorption mechanism being a hydrophobic interaction between the sand and the PFAS. In addition, the sequestration of PFAS onto clay particles (such as amended montmorillonite clays) has been shown, attributed to hydrogen bonding and hydrophobic and electrostatic interactions.

In addition to the interactions between sand and PFAS, as well as between clay and PFAS, IFGEM-7 includes ZVI, which synergistically acts to remove PFAS from an aqueous solution in combination with the sand and clay. While ZVI does not directly interact with PFAS, since ZVI oxidizes when in contact with oxygen and water and particles become coated with the oxides of iron, the oxidized ZVI attracts PFAS and acts on PFAS via chemical oxidation to break down the PFAS into shorter chains.

Specifically, ZVI can be oxidized to $Fe^{2+}$ (see Equations 1a and 1b), and further to $Fe^{3+}$ (See Equation 1c). Furthermore, carbon dioxide and alkyl radicals (R is $C_7F_{15}COOH$) result from the chemical oxidation of PFAS by the oxidized ZVI, in a process that is similar to the photoirradiation of oxidized carboxylate (Hori et al., 2007). Here, R is perfluorinated and can react in water resulting in unstable alcohol, which can then hydrolyze, yielding a $CF_2$ unit and a shorter chain PFAS (see Equation 2). The process proceeds as the resulting shorter chain PFAS continues to react until their complete mineralization to $CO_2$ and $F^-$ (Hori et al. 2007).

$$2Fe^0 + O_2 + 2H_2O \rightarrow 2Fe^{2+} + 4OH^- \quad \text{Eq. (1a)}$$

$$Fe^0 \rightarrow Fe^{2+} + 2e^- \quad \text{Eq. (1b)}$$

$$4Fe^{2+} + O_2 + 2H_2O \leftrightarrow 4Fe^{2+} + 4OH^- \quad \text{Eq. (1c)}$$

$$[Fe(III) + C_nF_{2n+1}OOH]^{2+} \rightarrow Fe^{2+} + CF_2 + C_{n-1}F_{2n-1}COOH \quad \text{Eq. (2)}$$

As such, the synergies among sand, clay and ZVI in IFGEM-7 facilitate the removal of PFOS and PFOA in several pathways. As noted above, the adsorption of PFAS onto clay can be attributed to hydrophobic/electrostatic interactions and hydrogen bonding.

Moreover, the surface charge of oxides such as Fe and Al is a function of pH, exhibiting a positive charge for pH values less than approximately 8.5 and a negative charge for pH values greater than approximately 8.5. In the Experimental Results section below, the pH of the influent (using canal water as the aqueous solution) ranged from 8.2-8.7 (see Table 3 in the Experimental Results section below); as such, the iron (Fe) oxides formed from ZVI exhibit a positive charge. The positively charged iron ions in IFGEM-7 (which coat the media contributing to the positive surface charge) readily undergo electrostatic interaction with the negatively charged sulfonic and carboxylic acid heads of PFOS and PFOA, respectively, within the typical range of pH of natural waters, to remove sulfonate and carboxylate PFAS functional groups. ZVI further removes PFOS and PFOA through reductive degradation and complex formation (Park et al. 2018). On the other hand, the point of zero charge for the control media was found to be at a pH of approximately 5.6; as such, no or limited electrostatic interaction occurs on the surface of CTS filtration media for the influent, resulting in lower removal efficiency for CTS.

Experimental Methods

In the procedures described herein, experimental results were obtained for the fixed-bed column testing of filtration media in removing PFOA and PFOS from water samples collected from different locations within the C-23 canal (a constructed canal draining farmland in northwest Martin County and southwest St. Lucie County, Florida). The water from C-23 was selected as it is located within the St. Johns River watershed and prolonged contamination of PFOA and PFOS, even at trace levels, may impact the sensitive Indian River Lagoon ecosystem. Water collected from within C-23 during the dry season was used as the influent. In addition to the assessment of basic water quality parameters, the water samples were analyzed for PFOS and PFOA at Eurofins Lancaster Environmental Laboratory (Lancaster, Pennsylvania) following the modified EPA 537.1 method, and for nutrients and algal toxins at Flowers's Chemical Laboratories (Altamonte Springs, Florida).

In the modified EPA 537.1 method, an aliquot of 250 mL water sample containing analytes and isotopically labeled internal standards is extracted through a weak anion exchange solid phase extraction cartridge. The analytes and internal standards are eluted from the solid phase with a small quantity of extraction solvent. The extract is evaporated and then mixed with a buffer solution. The reconstituted extract is injected to a C18 liquid chromatography (LC) column, and the analytes are separated using a gradient composition of methanol and 20 mM ammonium acetate in reagent water as the mobile phase. After elution from the column, the analyte concentrations are measured by electrospray ionization-tandem mass spectrometry.

As shown in FIG. 1, the experimental setup consisted of polyvinyl chloride (PVC) columns of 91.5 cm depth and 10.2 cm diameter, containing approximately 13.3 kg of CTS or 14.0 kg of IFGEM-7. Each PVC column was sectioned into three equal parts (30 cm each) to minimize media clogging. The column sections were stacked vertically by attaching them to a headboard, and the three sections of the column were placed in such a way that equal spacing was maintained between. The columns were wrapped with parafilm between each section to prevent air intrusion. Each section of the CTS and IFGEM-7 columns was filled with CTS and IFGEM-7 media, respectively, after slight compaction to minimize short circuiting. A filter layer comprised of aquarium pebbles and a fabric weed barrier was placed at the bottom of each column section. A layer of aquarium pebbles was also included at the top of each column section to prevent clogging and aid in distribution of the influent.

The column experiments were conducted in triplicate. Prior to running the column experiments, the columns were flushed with two bed volumes of distilled water to remove any background contamination of the media and left to drain for about 8 h, or until no more water dripped from the column's effluent, to avoid dilution of the effluent. Canal water utilized as influent condition was collected in five-gallon plastic buckets and stored at 0° C. in a walk-in refrigerator. The column influent water was spiked with 70 ng $L^{-1}$ each of PFOS and PFOA and administered to each column in a downflow mode with a constant flow rate of 14 mL min⁻¹. Effluent samples from the columns operated in triplicate were collected over a 12- and 40-h period and analyzed for PFOS and PFOA. The concentration of PFOS and PFOA in the influent and effluent samples were conducted at Eurofins Lancaster Laboratory following the modified EPA method 537.1.

Data obtained from the column studies described above were analyzed using selected dynamic adsorption models to determine PFOS/PFOA breakthrough, such that the suitability of the media for field-scale design and implementation could be analyzed.

These models are commonly applied to probe dynamic adsorption mechanisms by filtration media with real world applications. The Thomas and the Bohart-Adams (B-A) models have been used to account for dynamic adsorption mechanism during phosphorus removal (Jones et al. 2015) and to investigate oil and grease adsorption from refinery desalter effluent (Umembamalu et al. 2020), respectively. The Modified Dose Response (MDR), and Yoon Nelson models have been used for biosorbent application for heavy metal removal in wastewater and to estimate the scale-up parameters for adsorption columns (Abdolali et al. 2017). Further, the Wolborska model was used to fit the experimental data of metal removal when treating industrial wastewater (Singh et al. 2012).

The Thomas model is one of the most common and widely utilized dynamic models (Patel 2019). The Thomas model follows second-order reversible reaction kinetics assuming Langmuir kinetics (Thomas 1944). It is a simple model used to analyze fixed-bed adsorption columns, such as those in these procedures. The linear form of the Thomas model is presented by Equation 3, where the constant $k_{Th}$ is the Thomas rate constant (L·min⁻¹·ng⁻¹), m is the mass (in g), Q is the influent flow rate (in L·min⁻¹), t is time (in min) and $q_0$ is the maximum adsorption capacity of the media (in ng·g⁻¹). The maximum adsorption capacity, $q_0$ can be determined from the linear regression of $$\ln\left(\frac{C_0}{C_t} - 1\right) \text{ vs. } t \text{ plot.} \quad \text{Eq. (3)}$$

$$\ln\left(\frac{C_0}{C_t} - 1\right) = \frac{k_{Th}q_0 m}{Q} - k_{Th}C_0 t$$

The MDR is a numerical model (Yan et al. 2001), which can minimize errors from the Thomas model at lower and higher time periods (Recepoğlu et al. 2018). The variable $q_0$ (in ng·g⁻¹) is derived from the intercept and slope from the plot of $$\ln\left(\frac{C_t}{C_o - C_t}\right) \text{ vs.}$$

ln(C₀Qt), where $a_{mdr}$ is the MDR rate constant (dimensionless), the variables Q (in L·min⁻¹) and C₀ (in ng·L⁻¹) were previously defined, and m (in g) is the mass.

$$\ln\left(\frac{C_t}{C_o - C_t}\right) = a_{mdr}\ln(C_0 Qt) - a_{mdr}\ln(q_0 m) \quad \text{Eq. (4)}$$

The B-A model can describe the initial part of the breakthrough curve (Bohart and Adams 1920). One of the forms of the Bohart-Adams model is represented in Equation 5.

Here $k_{BA}$ is the B-A rate constant (in L·min⁻¹·ng⁻¹), and $q_0$ is the maximum adsorption capacity of the media (in ng·g⁻¹). By performing the linear regression of $$\ln\left(\frac{C_0}{C_t} - 1\right) \text{ vs.}$$

t plot, the variables $q_0$ and $K_{BA}$ can be determined. The linear form of the Thomas and B-A models look alike, and they are mathematically equivalent (Chu 2020), as the only difference lies in the isotherm assumption of each model. However, the Thomas model assumes pseudo-second-order reversible reaction kinetics (Chu 2010, Xu et al. 2013), while the B-A model assumes pseudo-first-order reversible reaction kinetics (Chu et al. 2011, Ying et al. 2020). However, if the kinetics from their batch studies follow the Langmuir isotherm, the Thomas and B-A model will yield similar results (González-López et al. 2021), suggesting the B-A model to be the limiting form of the Thomas model (Chu 2010, Hashim and Chu 2007). The B-A model usually describes the initial state of column operation (Chittoo and Sutherland 2020) and can represent a continuous adsorption system (e.g., fixed-bed columns with constant flow) (Patel 2019).

$$\ln\left(\frac{C_0}{C_t} - 1\right) = \frac{k_{BA}q_0 m}{Q} - K_{BA}C_0 t \quad \text{Eq. (5)}$$

The Yoon Nelson model was developed to model gas and vapor adsorption by activated carbon. The linear form of the model is represented by Equation 6 (Yoon and Nelson 1984), where $k_{YN}$ is the Yoon Nelson rate constant (in min⁻¹) and τ is time required for 50% of adsorbate breakthrough (min). The linear form of the Yoon Nelson model is obtained from the linear regression of the plot $$\ln\left(\frac{C_t}{C_o - C_t}\right) \text{ vs.}$$

t. The maximum adsorption capacity $q_0$ (in ng·g⁻¹) of the media can be calculated using Equation 7 (Simsek et al. 2014), where $C_o$(in ng·L⁻¹), Q (in L·min⁻¹), τ (in min) and m (in g) is the mass.

$$\ln\left(\frac{C_t}{C_o - C_t}\right) = k_{YN}t - \tau k_{YN} \quad \text{Eq. (6)}$$

$$q_0 = \frac{C_o Q \tau}{m} \quad \text{Eq. (7)}$$

The Wolborska model is derived based on the mass transfer diffusion mechanism at low concentrations (Wolborska 1989). In Equation 8, $\beta_a$ is the kinetic rate constant (in min⁻¹) and shows the effect of mass transfer in liquid phase and axial diffusion (Shanmugam et al. 2016), H is the height of the column (cm), v is the flow velocity (in cm·min⁻¹) and No (in ng·L⁻¹) is the maximum adsorption capacity. The Wolborska model yields the maximum adsorption capacity in ng·L$^{-1}$. These parameters are derived from the linear regression plot of ln vs. t.

$$\ln\left(\frac{C_t}{C_o}\right) \text{ vs. } t.$$

$$\ln\left(\frac{C_t}{C_o}\right) = \frac{\beta_a C_o t}{N_o} - \frac{\beta_a H}{v} \qquad \text{Eq. (8)}$$

In addition, a statistical analysis of variance (ANOVA) was utilized to compare the means based on the triplicate column runs and to determine if there was a significant difference in the removals of PFOS and PFOA when using CTS and IFGEM-7. Furthermore, the Kolmogorov-Smirnov (K-S) goodness of fit test was applied to PFOA adsorption (effluent concentration with respect to time) by CTS and IFGEM-7 to determine if there was any significant difference among the data distribution for individual breakthrough curves.

The K-S test, developed by Kolmogorov (Kolmogorov 1933) and Smirnov (Smirnov 1948), is a non-parametric test that utilizes cumulative distribution (Aslam 2019) based on the empirical cumulative distribution function. This approach calculates the maximum distance between two empirical cumulative distribution functions and makes no assumptions regarding the distributions of the data (Lanzante 2021). The K-S test for a cumulative distribution function is represented by Equation 9 (Lopes et al. 2007). The two-sample K-S test is helpful in the comparison of two samples to determine if they are from the same distribution (Luiz 2021). For the comparison of two different data sets corresponding to cumulative distribution functions $F_n(x)$ and $F(x)$, the K-S statistic is given by Equation 10. The empirical distribution function $F_n$ for n independent and identically distributed $X_i$ observations is given by Equation 11, where the term $I_{[-\infty,\,x]}(X_i)$ represents the indication function where it is 1 if $X_i \leq x$ or else 0 (Luiz 2021).

$$KS_n = \max|F_n(x) - F(x)| \qquad \text{Eq. (9)}$$

$$KS_{n,m} = \max|F_{1,n}(x) - F_{1,m}(x)| \qquad \text{Eq. (10)}$$

$$F_n(x) = \frac{1}{n} + \sum_{i=1}^{n} I_{[-\infty,\,x]}(X_i) \qquad \text{Eq. (11)}$$

Here, KS is the K-S statistic, $F_{1,n}(x)$ and $F_{1,m}(x)$ are the empirical distribution functions of the first and the second samples, respectively. The hypothesis statements are represented by Equations 12 and 13. Here, the null hypothesis (Ho) is rejected if $KS_{n,m}$ is adequately large according to Equation 14 at a confidence level a, meaning it is greater than the p-value from the statistical analysis.

$$H_o = F_n(x) = F(x) \qquad \text{Eq. (12)}$$

$$H_A = F_n(x) \neq F(x) \qquad \text{Eq. (13)}$$

$$KS_{n,m} \leq c(\alpha)\sqrt{\frac{n+m}{nm}} \qquad \text{Eq. (14)}$$

Experimental Results

Figure 2:
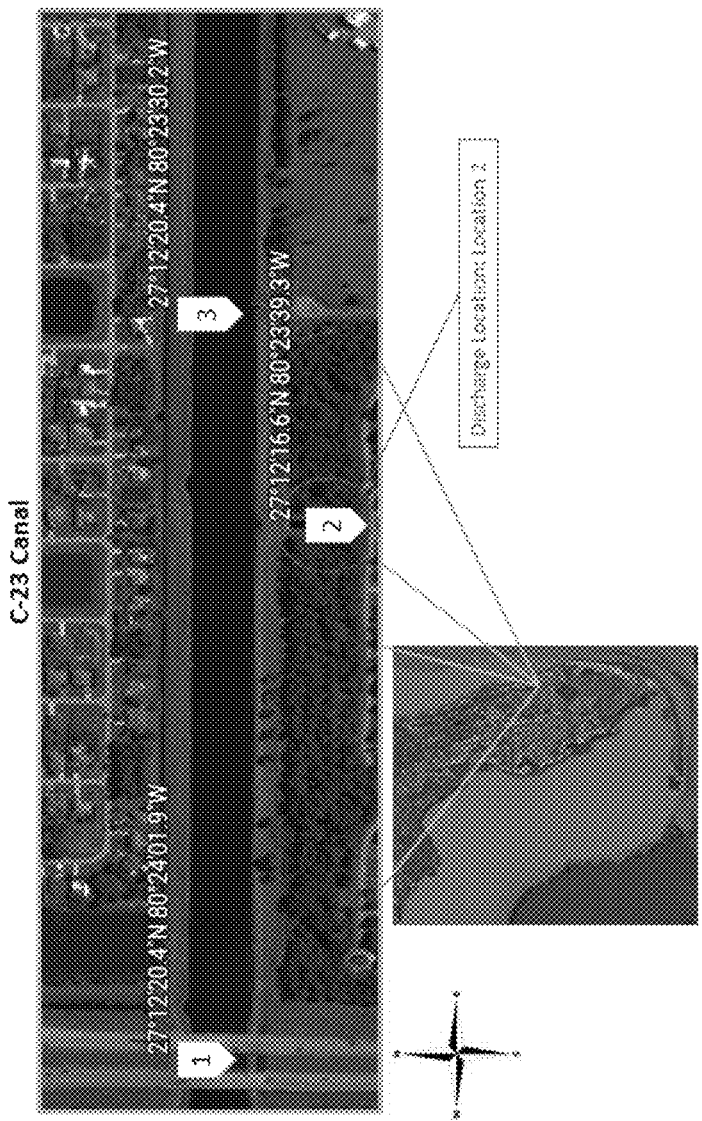
FIG. 2 is a top-down depiction of a location of a body of water (C-23) that is tested for PFAS removal, in accordance with an embodiment of the present invention.

The concentrations of PFOS and PFOA and other water quality parameters including oxidation-reduction potential (ORP), pH, temperature, nutrients [total nitrogen (TN), total phosphorous (TP)], tannic acid, and biochemical oxygen demand (BOD) at different locations within C-23 (shown in FIG. 2) are listed in Tables 2, 3, 4, and 5 below. Two sampling campaigns were performed, one during dry and wet seasons. The concentrations of PFOA ranged from 3.4 ng·L$^{-1}$ (dry season) to 14 ng·L$^{-1}$ (wet season) and those for PFOS ranged from 4.5 ng·L$^{-1}$ (dry season) to 19 ng·L$^{-1}$ (wet season). These concentrations are comparable to those observed in other sites in Florida including the Ocala Readiness Center and the Marianna Readiness Center, where the concentrations for PFOA and PFOS ranged from 1.6 to 16 ng·L$^{-1}$, and 7 to 9.7 ng·L$^{-1}$, respectively (Cui et al. 2020). Higher PFAS concentrations (9.7-14 ng·L$^{-1}$ for PFOA and 14-19 ng·L$^{-1}$ for PFOS) were found at locations 1 and 3 (within the body of the canal), in comparison to location 2 (3.4-3.6 ng·L$^{-1}$ for PFOA and 4.5-5.5 ng·L$^{-1}$ for PFOS) (a discharge location for the canal). While location 2 is a discharge point reflecting PFAS cared by the stormwater of the surrounding area (i.e., the subwatershed), locations 1 and 3 (the canal) exhibited higher concentrations PFOS and PFOA since these locations represent the receiving water body (i.e., the canal), indicating the accumulation of PFAS over time (Chen et al. 2017).

TABLE 2

PFAS background concentrations at sampling locations Canal-23.

| | Dry season (Jan. 27, 2021) | | Wet season (Jun. 2, 2021) | |
|---|---|---|---|---|
| Sample ID | PFOA (ng · L$^{-1}$) | PFOS (ng · L$^{-1}$) | PFOA (ng · L$^{-1}$) | PFOS (ng · L$^{-1}$) |
| Location 1 | 15 | 16 | 14 | 19 |
| Location 2 | 3.4 | 4.5 | 3.6 | 5.5 |
| Location 3 | 14 | 14 | 9.7 | 14 |

TABLE 3

Basic description of sampling locations with water quality and bacteria information.

| Sample ID | Latitude | Longitude | pH | Temp (° C.) | ORP (mV) | Phycocyan in (µg · L$^{-1}$) | Chlorophyll-a (µg · L$^{-1}$) | E. Coli (mpn · 100 ml$^{-1}$) | BOD$_5$ (mg · L$^{-1}$) |
|---|---|---|---|---|---|---|---|---|---|
| | | | | Dry Season (Jan. 27, 2021) | | | | | |
| Location 1 | 27.205676 | −80.400518 | 8.7 | 26.9 | 127.2 | 0.9 | 12.8 | 20 | 0 U |
| Location 2 | 27.204614 | −80.39424 | 8.2 | 24.8 | 139.3 | 0.6 | 2.82 | 0 U* | 0 U |
| Location 3 | 27.205674 | −80.391727 | 8.4 | 27.9 | 142.6 | 1.1 | 14.3 | 10 | 2.6 |

TABLE 3-continued

Basic description of sampling locations with water quality and bacteria information.

| Sample ID | Latitude | Longitude | pH | Temp (° C.) | ORP (mV) | Phycocyan in (µg · L$^{-1}$) | Chlorophyll-a (µg · L$^{-1}$) | E. Coli (mpn · 100 ml$^{-1}$) | BOD$_5$ (mg · L$^{-1}$) |
|---|---|---|---|---|---|---|---|---|---|
| Wet Season (Jun. 2, 2021) | | | | | | | | | |
| Location 1 | 27.205676 | −80.400518 | 8.6 | 28.9 | 133.1 | 2.2 | 51.9 | 50.4 | 2.6 |
| Location 2 | 27.204614 | −80.39424 | 8.7 | 29.9 | 141 | 1.1 | 4.8 | 2420 | 0 U |
| Location 3 | 27.205674 | −80.391727 | 8.5 | — | 148.1 | 1.8 | 33.2 | 435 | 3.2 |

*U stands for that the compound was analyzed for but not detected.

TABLE 4

Nutrient concentrations at sampling locations around C-23.

| Sample ID | Tannic Acid (mg · L$^{-1}$) | Organic Nitrogen (mg · L$^{-1}$) | TN (mg · L$^{-1}$ as N) | Nitrate (mg · L$^{-1}$ as N) | Nitrite (mg · L$^{-1}$ as N) | TKN (mg · L$^{-1}$ as N) | Ammonia (mg · L$^{-1}$ as N) | PO$_4^{3-}$ (mg · L$^{-1}$ as P) | TP (mg · L$^{-1}$ as P) | Ca$^{2+}$ (mg · L$^{-1}$) |
|---|---|---|---|---|---|---|---|---|---|---|
| Dry Season (Jan. 27, 2021) | | | | | | | | | | |
| Location 1 | — | 0.980 | 1.010 | 0.00 *U | 0.026 **I | 0.980 | 0.00 U | 0.018 | 0.048 | — |
| Location 2 | — | 0.912 | 1.020 | 0.0785 | 0.025 I | 0.912 | 0.00 U | 0.00 U | 0.019 | — |
| Location 3 | 85.73*** | 1.040 | 1.060 | 0.00 U | 0.026 I | 1.040 | 0.00 U | 0.018 | 0.057 | 96.03 |
| Wet Season (Jun. 2, 2021) | | | | | | | | | | |
| Location 1 | — | 1.220 | 1.330 | 0.110 | 0.020U | 1.220 | 0.00 U | 0.00U | 0.081 | 99.33 |
| Location 2 | — | 0.881 | 0.942 | 0.061 | 0.020U | 0.881 | 0.00 U | 0.00U | 0.048 | 39.93 |
| Location 3 | 87.03 | 1.030 | 1.070 | 0.042 | 0.020 U | 1.030 | 0.00 U | 0.00U | 0.082 | 93.93 |

*U stands for under detection limits with reading
**I signifies that the reported value is between the laboratory method detection limit and the laboratory quantitation limit.
***Sample held beyond the accepted holding time

TABLE 5

Dissolved Iron and Aluminum concentrations at locations around C-23.

| Sample ID | Aluminum, Dissolved (mg · L$^{-1}$) | Iron, Dissolved (mg · L$^{-1}$) |
|---|---|---|
| Dry Season (Jan. 27, 2021) | | |
| Location 1 | 0.01 *U | 0.0806 |
| Location 2 | 0.0120 **I | 0.114 |
| Location 3 | 0.0120 I | 0.0832 |
| Wet Season (Jun. 2, 2021) | | |
| Location 1 | 0.0889 | 0.292 |
| Location 2 | 0.0589 | 0.0399 |
| Location 3 | 0.0243 | 0.0279 |

*U stands for under detection limits with reading
**I signifies that the reported value is between the laboratory method detection limit and the laboratory quantitation limit.

The ORP levels in the canal ranged from 127.2 to 142.6 mV during the dry season and from 133.1 to 148.1 mV in the wet season, indicating that C-23 canal water is aerobic. The increase in bacteria (E. coli.) and algal toxin concentration in water during the wet season can be attributed to higher temperatures and higher nutrient concentrations (Paul, 2008). The BOD in the water varied from very good (1-2 ppm) to moderate (3-5 ppm) during the dry and wet season, respectively, according to the typical scale of BOD water quality (Maine Environmental Laboratory 2021). There was an increase in TP concentration in the wet season, from 0.048, 0.019, and 0.057 mg·L$^{-1}$ as P (dry season) to 0.081, 0.048, and 0.082 mg·L$^{-1}$ as P (wet season) at locations 1, 2, and 3, respectively. Similarly, the concentration of phycocyanin increased during the wet season from 0.9, 0.6, and 1.1 µg·L$^{-1}$ (dry season) to 2.2, 1.1, and 1.8 µg·L$^{-1}$ (wet season) at the locations 1, 2 and 3, respectively. The increased level of phycocyanin in the wet season is expected as TP is one of the principal forces driving cyanobacteria growth, which increased with temperature (Wagner and Adrian 2009).

Furthermore, the nitrogen species concentrations remained constant during the two different seasons with TN concentrations ranging between 1.01 and 1.06 mg·L$^{-1}$ as N, during the dry season and between 0.94 and 1.33 mg·L$^{-1}$ as N during the wet season. The concentration of nitrate ($NO_3^-$) in C-23 ranged from 0 to 0.079 mg·L$^1$ as N during the dry season and 0.042 to 0.110 mg·L$^{-1}$ as N during the wet season, well below the EPA nitrate standard of 10 mg·L$^{-1}$ as N. However, data showed that the nutrients and BOD concentrations in C-23 exceeded the Total Maximum Daily Dose set for this area (0.72, 0.081 and 2 mg·L$^{-1}$ for TN, TP, and BOD, respectively) (Mittler and Turner 2017). While the concentration of calcium ion (Ca$^{2+}$) in the C-23 ranged from 39.9 to 99.3 mg·L$^{-1}$, this can be a consequence of weathering of minerals. Finally, the concentrations of dissolved aluminum and iron in C-23 ranged from 0.01 (dry season) to 0.0889 (wet season) mg·L$^{-1}$ and from 0.0279 to 0.292 mg·L$^{-1}$ (dry and wet seasons). Moreover, concentrations of tannic acid in C-23 ranged from 85.73 to 87.03 mg·L$^{-1}$ during the dry and wet season, respectively.

The removal of PFOA and PFOS from aqueous solutions is a challenging task due to the complex chemical structure of the compounds comprising hydrophilic functional groups and a hydrophobic fluorine-saturated carbon-chain. The removal efficiencies of PFOS and PFOA by CTS and IFGEM-7 filtration media in fixed-bed columns based on a spiked concentration of 70 ng L-1 of PFOA and PFOS (see the Experimental Methods section above) are presented in FIG. 3A, with removal by CTS being shown in the left graph of FIG. 3A, and with removal by IFGEM-7 being shown in the right graph of FIG. 3A.

Both media (i.e., CTS and IFGEM-7) exhibited removals above 97% for PFOS throughout the duration of the column studies. However, while the removal of PFOA by CTS exceeded 96% during the first 6 h of the column operation, the removal by CTS decreased during the subsequent hour to 23%. Finally, after 8-12 h of filtration, PFOA removals by CTS reached negative levels (−36% and −50%), suggesting that the media reached its capacity within the first 7 h of operation.

IFGEM-7 demonstrated PFOA removals above 95% during the first 9 h of the column study; after 12 h, the removal efficiency decreased to 72%. During the following hours (18 to 33 h), PFOA removal by IFGEM-7 decreased to the range of 4% to 18%, finally reaching exhaustion at around 36 h. IFGEM-7 also exhibited negative removal (−0.5% to −1.4%) after the media reached its capacity, although to a lesser extent when compared to CTS (−36% and −50%).

The breakthrough of PFOA in each filtration media was also studied. Typically, breakthrough curves can be characterized by four points—the breakpoint ($t_b$), the mass transfer point ($t_{0.5}$), the operating limit of the column point ($t_{0.9}$), and the complete exhaustion point ($t_e$) (Chowdhury et al. 2015). At the breakpoint, the ratio of $C_t$ and $C_o$ is equal to 0.05 ($C_t/C_o=0.05=t_b$). The point when the rate of $C_t$ and $C_o$ is equal to 0.5 ($C_t/C_o=0.5=t_{0.5}$) is known as the mass transfer zone; at this point, the media reaches half of its adsorption capacity. The exhaustion point is the point when the value of $C_t/C_o$ is equal to 1, when the media reaches its equilibrium capacity of adsorption ($t_e$). However, the operating limit of the column is defined by 90% of media adsorption capacity, i.e., the point at the breakthrough curve when the $C_t/C_o$ is equal to 0.9 ($C_t/C_o=0.9=t_{0.9}$).

For the CTS control filtration media, $t_b$, $t_{0.5}$, $t_{0.9}$, and $t_e$ were 6.2, 6.7, 7.2, and 7.3 h, respectively. For the IFGEM-7 filtration media, $t_b$, $t_{0.5}$, $t_{0.9}$, and $t_e$ were 9.5, 14.4, 20.5, and 35 h, respectively. Hence, IFGEM-7 took longer to reach the exhaustion point (as shown in the right graph of FIG. 3B) than CTS (as shown in the left graph of FIG. 3B). Nevertheless, after the media reached exhaustion, some possible "leaching" of PFAS was observed (i.e., $C_t/C_o>1$ and with negative removal efficiency), which was more pronounced in the case of CTS. The PFAS leaching from CTS after about 9 h may be related to the presence of tire crumb—previous studies have reported the leaching of PFAS from artificial turf fields, which were made of recycled tires (Glüge et al. 2020). On the other hand, the breakthrough point was not visible for PFOS as breakthrough was not observed given the prolonged almost complete removals (~100%) during the column operation.

Moreover, the ANOVA test confirmed that there was a significant difference between the removal efficiencies with respect to time of PFOS and PFOA for both CTS (F-value (6.64)>F-critical (4.60)) and IFGEM-7 (F-value (13.94)>F-critical (4.30)). Furthermore, a two tailed KS test was applied to the PFOA breakthrough curves of CTS and IFGEM-7 (effluent concentration time series) (shown in the left graph of FIG. 3B for CTS, and shown in the right graph of FIG. 3B for IFGEM-7). The resultant D value and the p-value (for α=0.05) were 1 and 0.028, respectively, and hence, the null hypothesis should be rejected, thereby confirming that the distribution of the two breakthrough curves is different. As a result, the PFOA breakthrough curves for CTS and IFGEM-7 are significantly different at a 95% confidence level.

Figure 4:
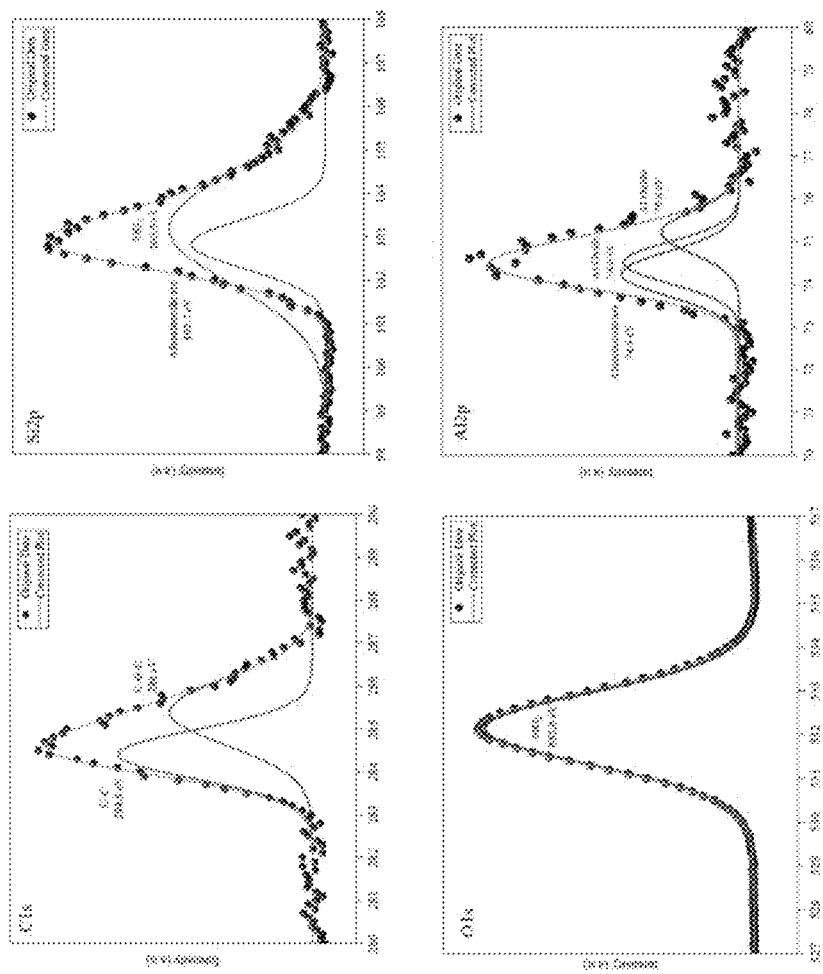
FIG. 4 depicts x-ray photoelectron spectroscopy (XPS) spectra for CTS filtration media, showing C1s (in section A), O1s (in section B), Si2p (in section C), and Al2p (in section D), as plotted for intensity versus the binding energy (in eV), in accordance with an embodiment of the present invention.
Figure 5:
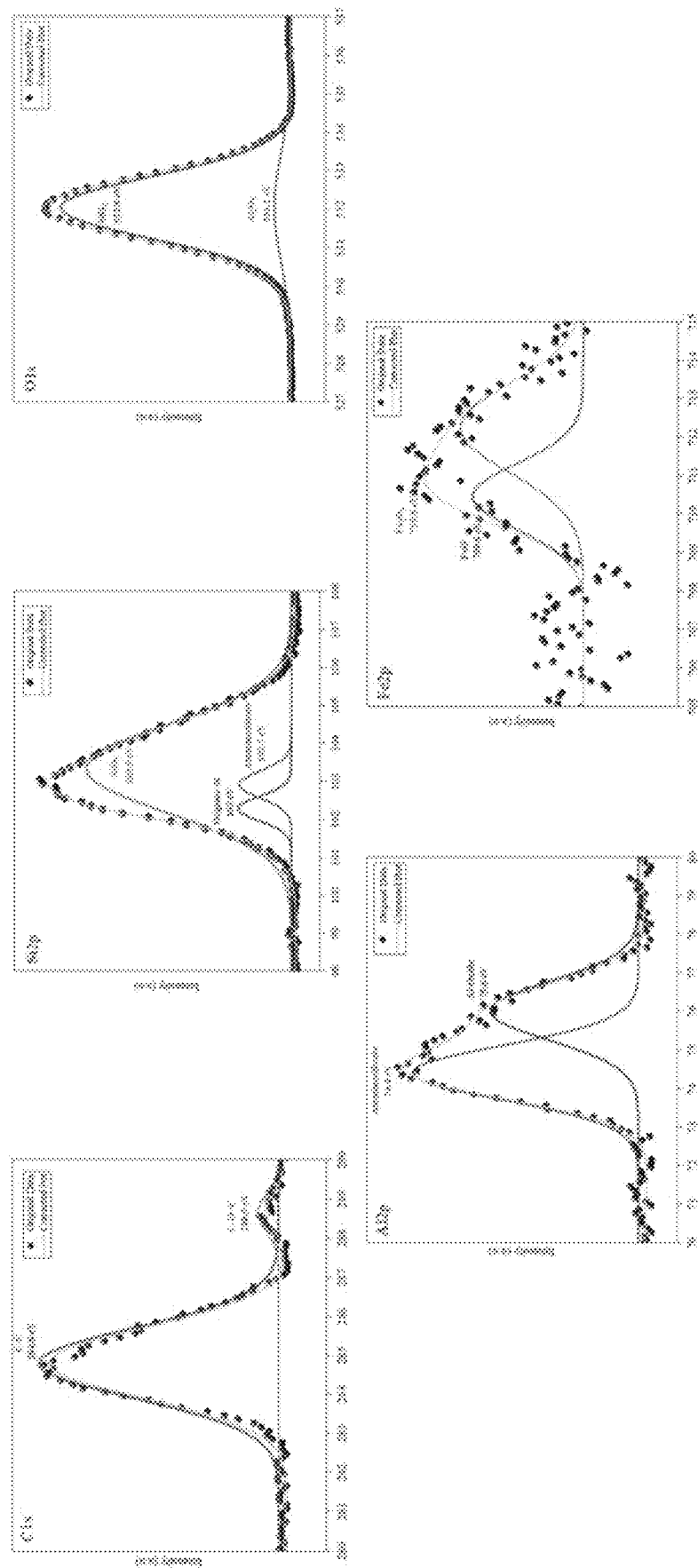
FIG. 5 depicts XPS spectra for IFGEM-7 filtration media, showing C1s (in section A), O1s (in section B), Si2p (in section C), Al2p (in section D), and Fe2p (in section E), as plotted for intensity versus the binding energy (in eV), in accordance with an embodiment of the present invention.
Figure 6:
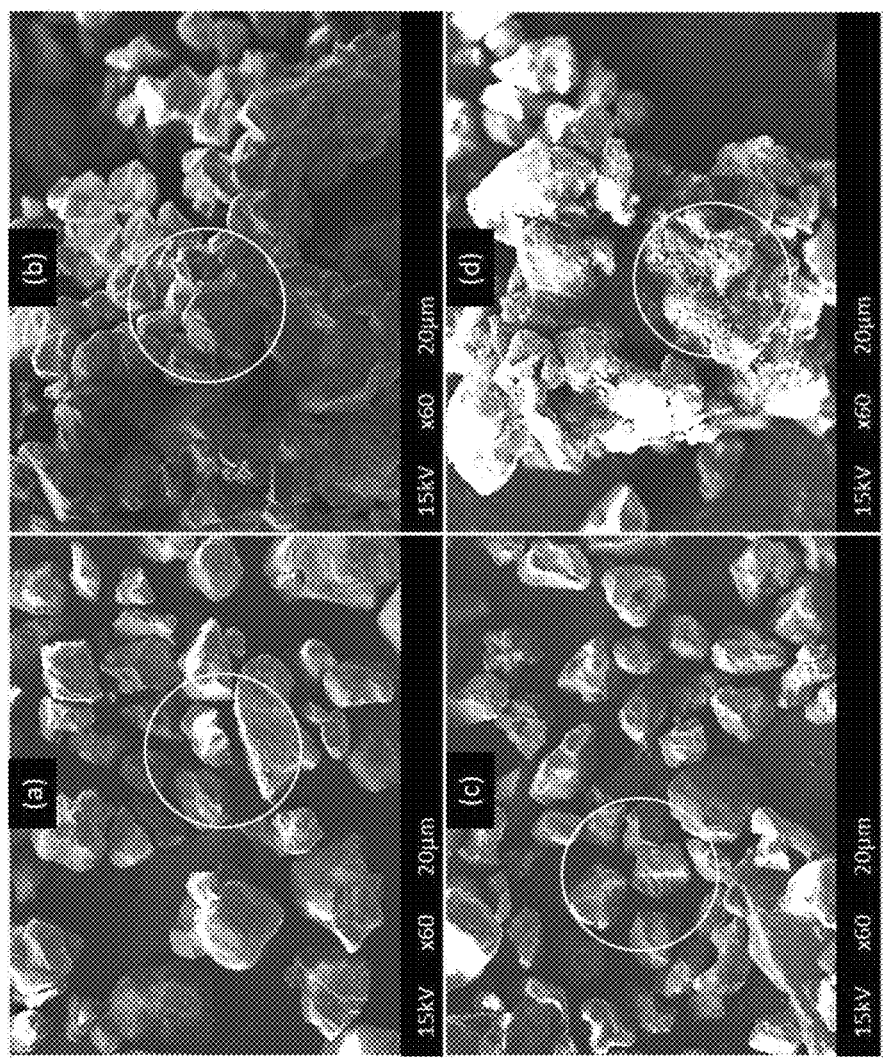
FIG. 6 depicts scanning electron microscopy (SEM) images showing a raw CTS media (depicted in section A); an exhausted CTS media (depicted in section B); a raw IFGEM-7 media (depicted in section C); and an exhausted IFGEM-7 media (depicted in section D), in accordance with an embodiment of the present invention.

The chemical compositions of CTS and IFGEM-7 before and after the PFOS and PFOA-spiked fixed-bed column Experimental Methods were analyzed using x-ray fluorescence (XRF) and XPS (as summarized in Tables 6 and 7 and FIGS. 4 and 5, respectively) to facilitate the understanding of PFOS and PFOA removal mechanisms be the selected media (Table 6). To verify the homogeneity of the media mixing process, triplicate samples of the raw filtration media were collected and analyzed using XRF, and the standard deviation of the constituents was calculated (Kempenaers, 2020). As expected, the main components of the media are $SiO_2$ (silica) followed by $Al_2O_3$ (alumina), making up to 83.56±0.95% and 9.57±0.61% of CTS, respectively, and 80.93±3.63% and 8.37±2.79% for IFGEM-7, respectively. The chemical oxide $Fe_2O_3$ was detected at lower concentrations in CTS (0.14±0.02%) in comparison with IFGEM-7 (1.80±0.71%). In addition, sections A and B of FIG. 6 show the SEM images of CTS raw (section A) and exhausted media (section B), respectively. Section C and D of FIG. 6 show the SEM images of IFGEM-7 raw (section C) and exhausted media (section D), respectively. The discrete raw media particles (sections A and C of FIG. 6) became "agglomerated" or "clustered" upon exhaustion (sections B and D of FIG. 6).

TABLE 6

Elemental composition of raw filtration media CTS and IFGEM-7 based on XRF analysis (values in parentheses corresponding to standard deviation of 3 samples

| CTS | | IFGEM-7 | |
| --- | --- | --- | --- |
| Compound | Concentration (%) | Compound | Concentration (%) |
| Al | 8.57 (±0.61) | Al | 8.37 (±2.79) |
| Si | 83.59 (±0.95) | Si | 80.93 (±3.63) |
| P | 1.86 (±0.14) | P | 1.69 (±0.15) |
| S | 0.51 (±0.22) | S | 0.21 (±0.29) |
| Cl | 1.29 (±0.76) | Cl | 1.34 (±0.45) |
| K | 2.32 (±0.16) | K | 1.70 (±0.74) |
| Ca | 1.03 (±0.05) | Ca | 0.74 (±0.15) |
| Ti | 0.38 (±0.13) | Ti | 1.18 (±1.33) |
| Fe | 0.31 (±0.05) | Fe | 3.88 (±1.18) |

TABLE 7

Chemical oxide composition of raw filtration media CTS and IFGEM-7 based on XRF analysis (values in parentheses corresponding to standard deviation of 2 samples

| CTS | | IFGEM-7 | |
| --- | --- | --- | --- |
| Compound | Concentration (%) | Compound | Concentration (%) |
| $Al_2O_3$ | 10.14 (±0.56) | $Al_2O_3$ | 9.96 (±3.82) |
| $SiO_2$ | 86.39 (±1.08) | $SiO_2$ | 83.84 (±4.21) |
| $P_2O_3$ | 1.42 (±0.14) | $P_2O_3$ | 1.41 (±0.35) |
| $SO_3$ | 0.42 (±0.18) | $SO_3$ | 0.22 (±0.32) |
| Cl | 0.42 (±0.27) | Cl | 0.47 (±0.29) |
| $K_2O$ | 0.93 (±0.02) | $K_2O$ | 0.84 (±0.36) |
| CaO | 0.46 (±0.05) | CaO | 0.38 (±0.14) |
| $TiO_2$ | 0.22 (±0.08) | $TiO_2$ | 0.88 (±0.94) |
| $Cr_2O_3$ | 0.01 (±0.01) | MnO | 0.02 (±0.01) |
| $Fe_2O_3$ | 0.14 (±0.02) | $Fe_2O_3$ | 1.80 (±0.71) |
| ZnO | 0.04 (±0.01) | CuO | 0.01 (±0.00) |
| Br | 0.01 (±0.01) | SrO | 0.01 (±0.00) |
| SrO | 0.01 (±0.00) | $Cr_2O_3$ | 0.01 (±0.01) |
| $SnO_2$ | 0.01 (±0.00) | | |

Figure 7:
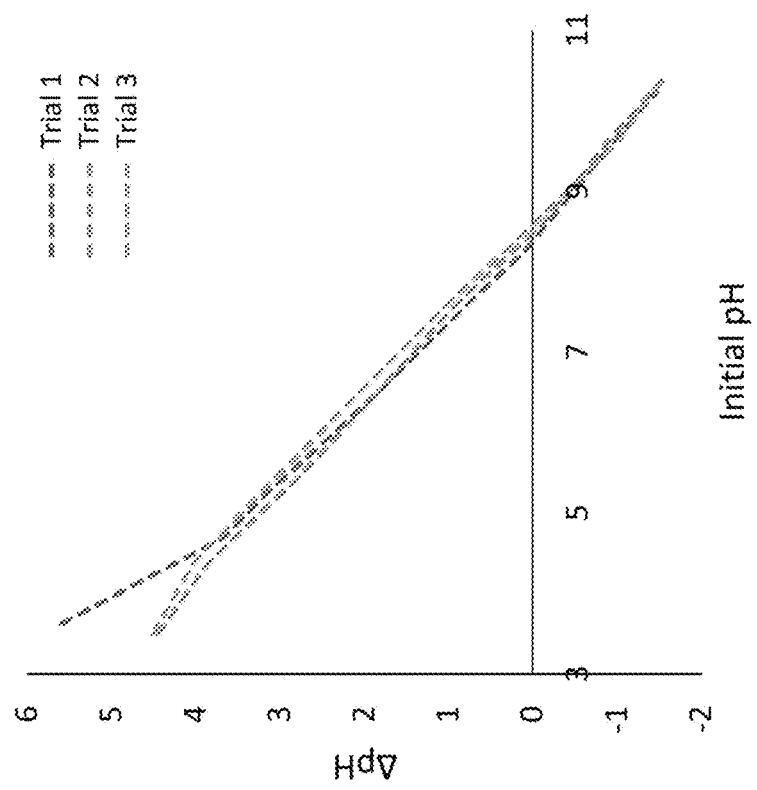
FIG. 7 is a graphical depiction of initial pH versus ΔpH for the pH of zero charge ($pH_{PZC}$) of CTS (in the left graph) and of IFGEM-7 (in the right graph), in accordance with an embodiment of the present invention.
Figure 7:
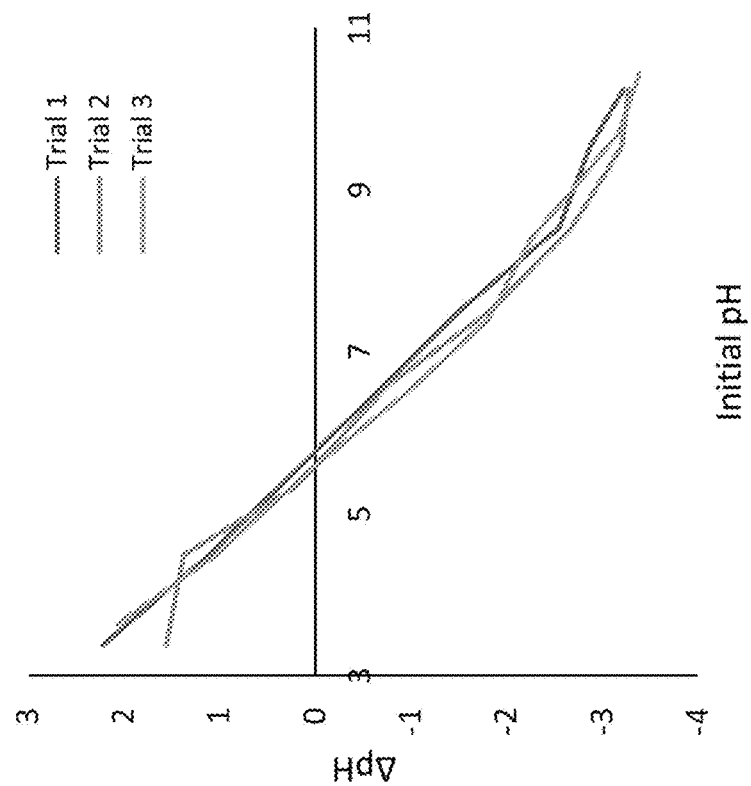

To further characterize the removal mechanism, the $pH_{PZC}$ (the point of zero charge pH, i.e., the pH when the charge in the adsorbent surface is zero) of the control media and the filtration media were measured (with results shown in FIG. 7). The $pH_{PZC}$ was determined following the salt addition method in triplicate. In this method, an aliquot of 40 mL of 0.2 M $NaNO_3$ was first prepared, and the pH solution on each flask was adjusted to 3.5, 4.5, 5.5, 6.5, 7.5, 8.5, 9.5, and 10.5, denoted at the initial pH ($pH_i$), by adding either NaOH (0.1 M) or $HNO_3$ (0.1 M). Next, for each media, 5 g of the composition was added to each of the solutions and shaken for 24 h on a shaking platform at a speed of 150 rpm, at a room temperature of 22-23° C. The samples were then filtered by a 0.45 μm membrane filter, and the pH was measured to obtain the final pH value ($pH_f$), followed by calculating the change in pH ($\Delta pH$) by subtracting $pH_f$ from $pH_i$. The $pH_{PZC}$ was determined by locating the point where the $\Delta pH$ is equal to zero, and the $pH_{PZC}$ parameter provides information on the surface charge, aiding in the understanding of the electrostatic interaction between the filtration media and PFOS and/or PFOA.

As shown in FIG. 7, the $pH_{PZC}$ for CTS (the left graph of FIG. 7) and for IFGEM-7 (the right graph of FIG. 7) were found to be at pH of 5.6 (±0.08) and 8.5 (±0.08), respectively. As such, the surface of CTS is positively charged at pH<5.6 but negatively charged at pH>5.6. For IFGEM-7, the $pH_{PZC}$ was found at 8.5, stipulating that at pH<8.5, the surface of IFGEM-7 is positively charged, whereas at pH>8.5, the surface of IFGEM-7 is negatively charged. Wang et al. reported that the $pH_{PZC}$ for iron oxides ranges between 6 and 9.2, supporting the $pH_{PZC}$ of IFGEM-7 to be at a higher pH than for CTS.

Hellsing et al. (2016) observed no adsorption of PFOA and PFOS onto silica surface due to its negative charge, but these compounds were adsorbed onto the positively charged alumina surface. Ochoa-Herrera and Sierra-Alvarez (2008) also suggested that aluminum may drive the adsorption process of both PFOA and PFOS onto zeolites. This can be related to these Experimental Results, since the previous studies support the higher removal of PFOS by the sorption media compared to PFOA observed in the Experimental Results, attributable to the higher degree of affinity between alumina ($Al_2O_3$) and the functional groups of PFOS (Wang and Shih 2011).

When comparing the raw and exhausted media, it is to be noted that Fe concentration increased following media usage, suggesting the transformation of iron within the media to dissolved ionic forms. The large increase in $Fe_2O_3$ in IFGEM-7, from 1.82% to 14.28%, indicates iron oxidation in the exhausted media from the breakdown and utilization of the ZVI. Additionally, the increase in Fe percentage after media treatment can result from the loss of other chemical compounds in the media during operation. Furthermore, the effect of dissolved Fe and dissolved Al in the canal water should be accounted for since the concentrations of Al and Fe ranged from 0.02-0.3 mg L and 0-0.089 mg $L^1$ at locations 1-3 (Table 5), respectively, which may accumulate in the media. Although the concentrations of $Al_2O_3$ and Al decreased in IFGEM-7, the concentrations increased in the exhausted CTS media as the generation of $Al_2O_3$ is expected from the oxidation of aluminum during the column operation. Furthermore, the increase in CaO in the exhausted CTS and IFGEM-7 could be attributed to the retention of calcium from the influent.

The functional groups of natural organic matter can interact with PFAS via electrostatic or hydrophobic interactions affecting the overall adsorption of PFAS onto the filtration media. Moreover, the presence of inorganic anions can negatively affect PFAS adsorption as it may compete for available adsorption sites. However, several studies concerning the adsorption of PFAS onto different sorbents including activated carbon (Du et al. 2015) and kaolinite (Xiao et al. 2011) have suggested that the monovalent and divalent cations (i.e., $Ca^{2+}$ and $Na^+$) could enhance PFAS adsorption. Wang et al. and Zhao et al. demonstrated that higher concentration of $Ca^{2+}$ at alkaline pH resulted in an increase in the rejection of PFOS via nanofiltration membranes, owing to calcium bridging. The interaction between $Ca^{2+}$ and the sulfonate group of the PFOS resulted in enhanced molecular polarity and size of PFOS. Tang et al. (2010) reported that the sorption of PFOS to goethite increased with the increase in concentrations of $H^+$ and $Ca^{2+}$, since $Ca^{2+}$ (like organic matter) promotes electrostatic adsorption between PFOS and the surface of filtration media. The sorption of PFOS through electrostatic attraction will potentially increase with the increase in the concentration of $Ca^{2+}$. You et al. (2010) showed that the sorption of PFOS to sediment increased with increasing concentrations of $Ca^{2+}$ in the water. However, if the adsorptive interaction is non-electrostatic like the adsorption of PFOS to silica, then $Ca^{2+}$ and pH would have limited effect on adsorption. This suggests that the presence of $Ca^{2+}$ in water can further enhance the removal of PFAS via IFGEM-7, unlike CTS, where the effect on adsorption would be limited.

The IFGEM-7 filtration media had not been previously tested for PFAS removal from a surface water matrix. Hence, to understand the adsorption process and determine the most suitable kinetic model, three different dynamic models were evaluated for both types of media (IFGEM-7 and CTS) using PFOA adsorption data only, since PFOS did not demonstrate breakthrough. For CTS, the Thomas and Yoon-Nelson models demonstrated the highest correlation values ($R^2$=0.56), with the MDR model demonstrating the lowest correlation ($R^2$=0.42) (Table 8).

For IFGEM-7, the Thomas and Yoon-Nelson models obtained strong correlations with $R^2$=0.86, followed by MDR ($R^2$=0.67). The higher performance and correlation exhibited by Thomas model for both types of media suggest that the dynamic behavior of the breakthrough curves can be described by Langmuir kinetics of adsorption and second-order reversible reaction kinetics, which the Thomas model is based upon (Liu et al. 2019). Accordingly, PFOA adsorption may be limited to single molecular layer onto the media for the fixed-bed column process.

Hence, the Thomas model was considered as the most suitable model for the Experimental Methods to describe the adsorption behavior by both media. The Thomas non-linear model generally applies to adsorption processes that are subject to both external and internal diffusion after mass transfer of both convective mass transfer and molecular diffusion in a liquid phase (Shanmugam et al. 2016; Thomas 1944). It is followed by film diffusion between the liquid phase and the exterior surface of the adsorbent's unused capacity, intrapellet mass transfer via both surface diffusion and pore diffusion, and the adsorption-desorption reaction before and after equilibrium (Crittenden et al. 1986). Although it is observed that the MDR model exhibited higher $q_0$ values, the selection of the preferred dynamic adsorption models for implementation are based on high $R^2$ and its suitability for comparison of the adsorption capacity.

TABLE 8

Correlation coefficient and model parameters in dynamic PFOA adsorption modeling analyses

| Model | CTS | | IFGEM-7 | |
|---|---|---|---|---|
| Thomas | $R^2$ | 0.56 | $R^2$ | 0.87 |
| | $K_{TH}$ (L · ng$^{-1}$ · min$^{-1}$) | $1.7(10)^{-4}$ | $K_{TH}$ (L · ng$^{-1}$ · min$^{-1}$) | $5.7(10)^{-5}$ |
| | $q_0$ (ng · g$^{-1}$) | 0.04 | $q_0$ (ng · g$^{-1}$) | 0.09 |
| MDR | $R^2$ | 0.42 | $R^2$ | 0.79 |
| | $a_{mdr}$ | 2.79 | $a_{mdr}$ | 2.94 |
| | $q_0$ (ng · g$^{-1}$) | 0.05 | $q_0$ (ng · g$^{-1}$) | 0.10 |
| Yoon Nelson | $R^2$ | 0.56 | $R^2$ | 0.87 |
| | $K_{YN}$ (min$^{-1}$) | $13.2(10)^{-3}$ | $K_{YN}$ (min$^{-1}$) | $4.5(10)^{-3}$ |
| | $\tau$ (min) | 477 | $\tau$ (min) | 1110 |

Figure 3A:
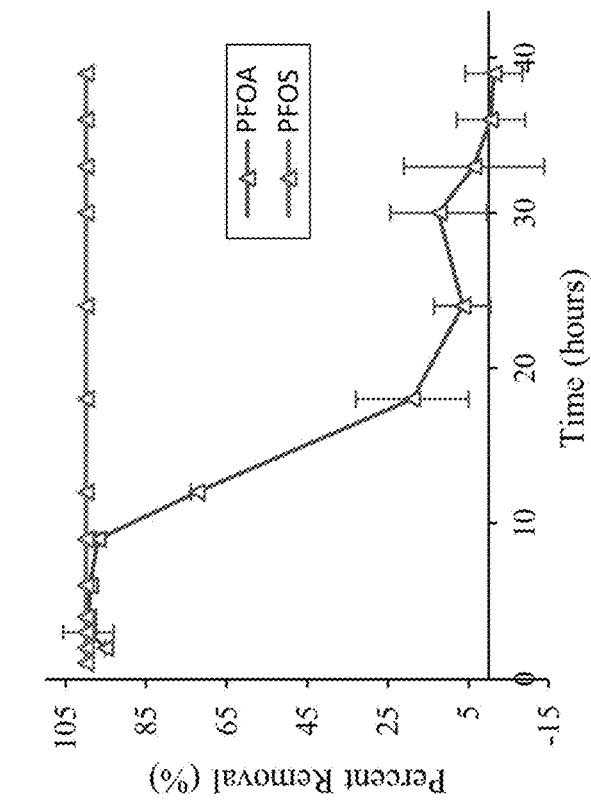
FIG. 3A is a graphical depiction of PFOS and PFOA percentage removals using CTS (in the left graph) and using IFGEM-7 (in the right graph), in accordance with an embodiment of the present invention.
Figure 3A:
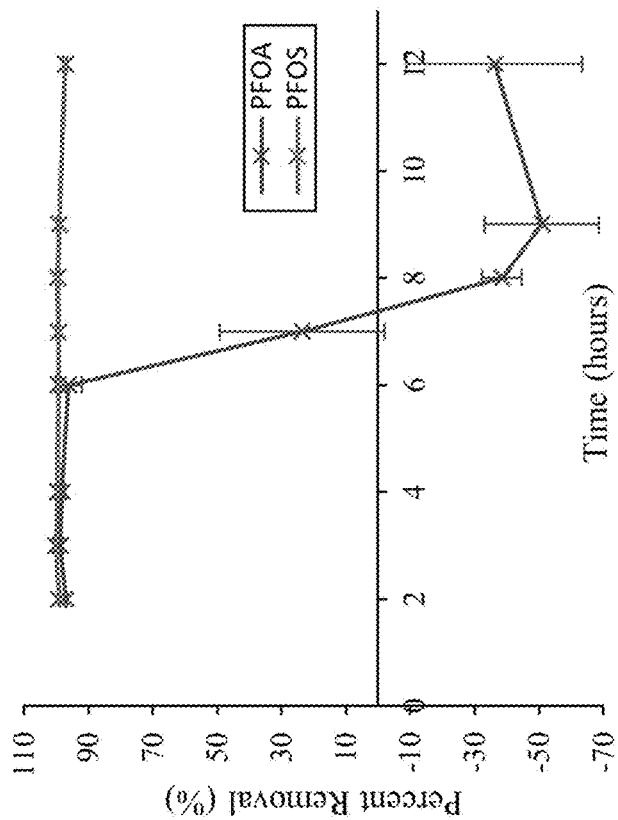
Figure 3B:
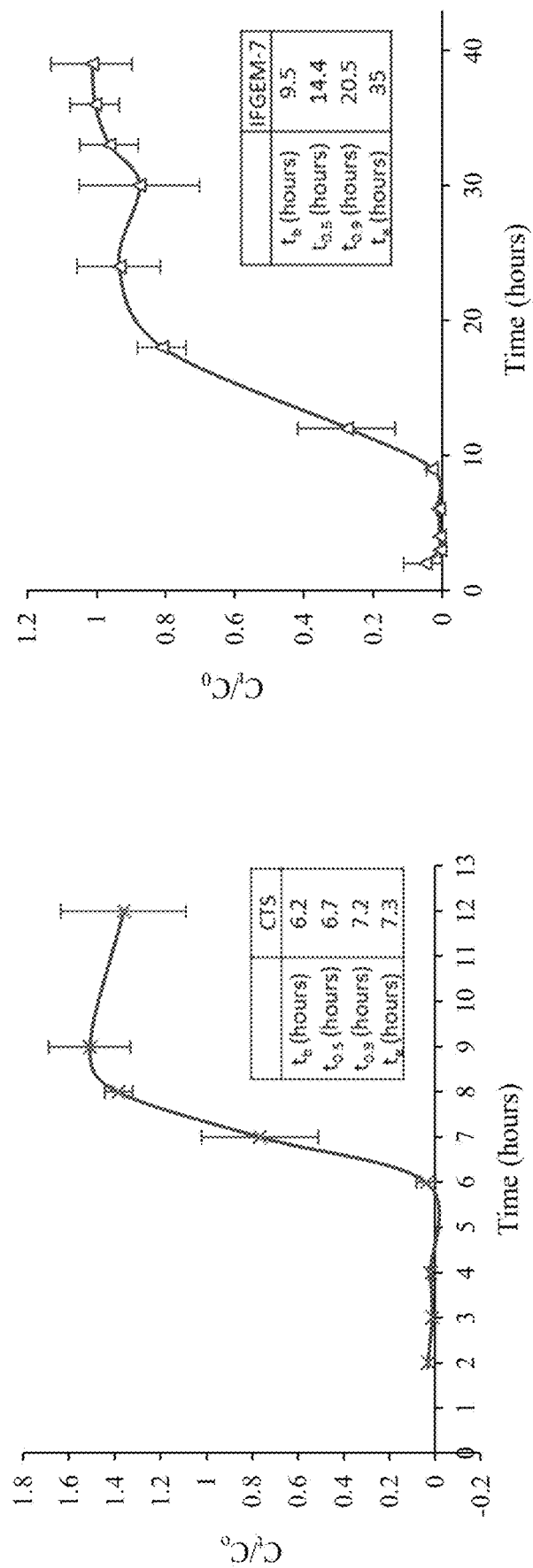
FIG. 3B is a graphical depiction of breakthrough curves showing a breakthrough of PFOA into the CTS media (in the left graph) and into the IFGEM-7 media (in the right graph), in accordance with an embodiment of the present invention.
Figure 8A:
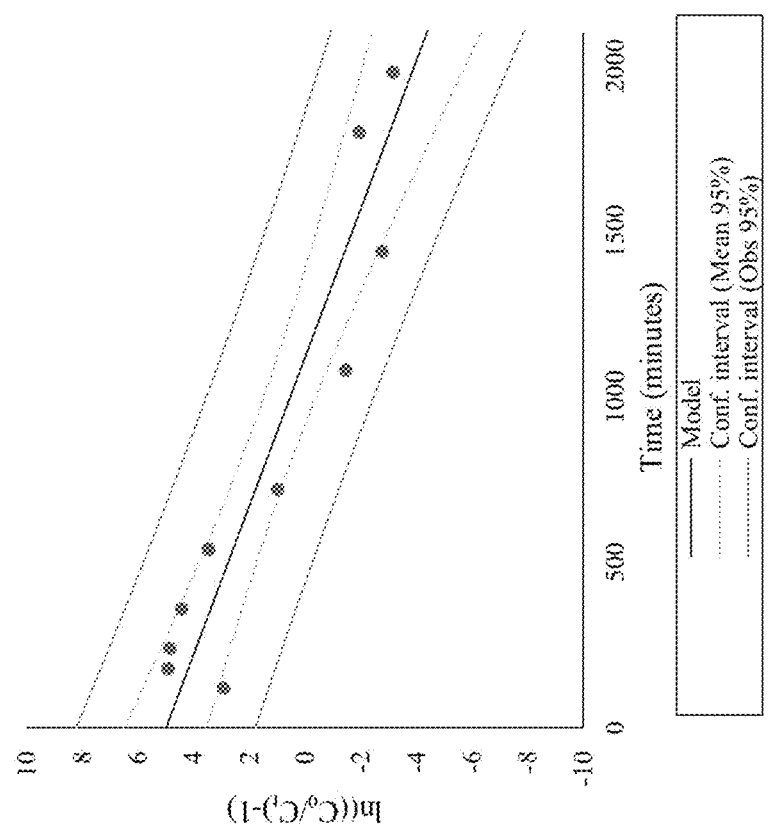
FIG. 8A is a graphical depiction of a dynamic media adsorption model (a Thomas model linear regression model) for PFOA removal by CTS, in accordance with and embodiment of the present invention.
Figure 8B:
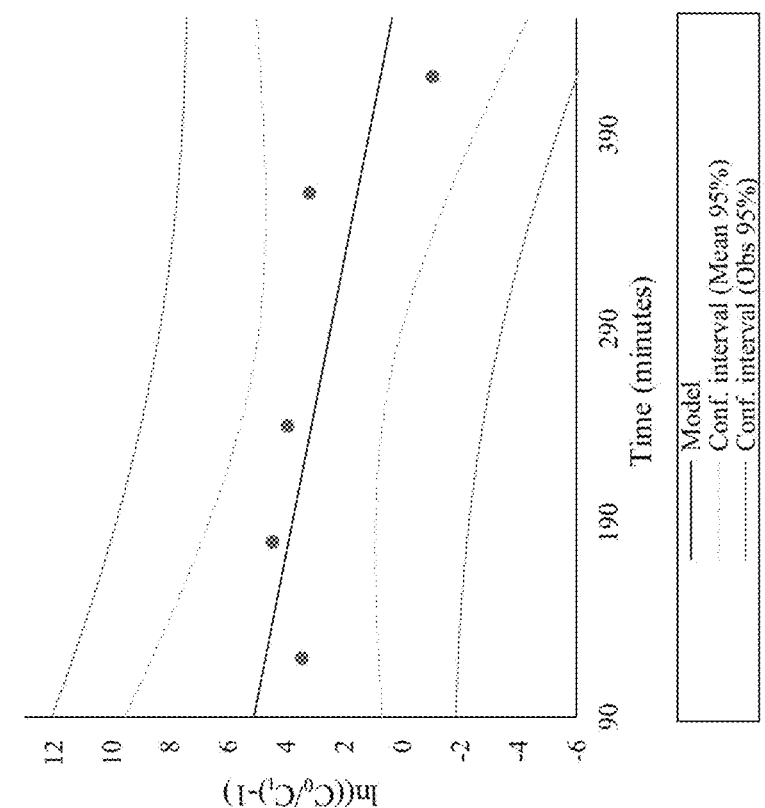
FIG. 8B is a graphical depiction of a dynamic media adsorption model (a Thomas model linear regression model) for PFOA removal by IFGEM-7, in accordance with and embodiment of the present invention.

The time difference between the breakthrough and the exhaustion points for CTS was much shorter (as shown in FIGS. 3A and 3B) than that for IFGEM-7, which is supported by the larger $K_{TH}$ constant and the smaller $\tau$ value for CTS compared to IFGEM-7. The time required for 50% breakthrough ($\tau$) was approached earlier (477 min) for CTS. This was about half of the $\tau$ of IFGEM-7 (1110 min) when removing PFOA. Additionally, the longer time for IFGEM-7 to reach equilibrium can be attributed to the larger surface area of IFGEM-7 (3.11 m$^2$·g$^{-1}$) compared to CTS (0.86 m$^2$·g$^{-1}$), providing more sites available for adsorption (Gong et al. 2016). Moreover, the observed high standard deviation of triplicates in PFOA adsorption curves FIGS. 3A and 3B) can be related to the smaller rate constant and shorter breakthrough for CTS runs. The plots from the linear regression curves of CTS and IFGEM-7 are presented in FIG. 8A (for CTS) and FIG. 8B (for IFGEM-7) to demonstrate the goodness of fit of the dynamic adsorption model with uncertainty, reflecting a 95% confident interval.

CONCLUSION

These Experimental Methods studied the efficiency and mechanisms of removal of PFOS and PFOA from surface waters when using two filtration media, IFGEM-7 and CTS, serving as a control, and through a dynamic fixed-bed column study. IFGEM-7 exhibited better performance in removing PFOA and PFOS from C-23 canal water in comparison to CTS. The better performance of IFGEM-7 was attributed to the larger surface area of IFGEM-7, the positive surface charge (at pH<8.5), higher $K_T H$ constant, and higher adsorption capacity ($q_0$) when compared to CTS. The Thomas model serves as the most suitable dynamic model for representing the PFOA adsorption data onto IFGEM-7 and enabling the estimation of $q_0$. The larger surface area of IFGEM-7 provides more available sites for absorption, while the positive surface charge at pH<8.5 of IFGEM-7 results in electrostatic interactions facilitating PFAS removal. PFOS showed a higher removal efficiency than PFOA for both media, attributable to the better affinity of alumina ($Al_2O_3$) with PFOS functional groups and a higher rate constant. The chemical composition of the media, as demonstrated through XRF, further suggested that $Al_2O_3$, being a component of the raw media, may contribute to the adsorption potential of the media due to its positively charged surface. Also, the higher Fe content of IFGEM-7 causes better adsorption of PFOS/A.

REFERENCES

Abdel-Fattah T M, Wixtrom A, Arias L, Zhang, K, Baumgart H (2017) Quantitative analysis of X-ray fluorescence absorption and emission for thickness determination of ALD-grown metal and oxide nanoscaled films. Journal of Nanoscience & Nanotechnology 17(8), 5745-5750.

Abdolali A, Ngo H H, Guo W, Zhou J L, Zhang J, Liang S, Chang S W, Nguyen D D, Liu Y (2017) Application of a breakthrough biosorbent for removing heavy metals from synthetic and real wastewaters in a lab-scale continuous fixed-bed column. Bioresource technology 229, 78-87.

Achak M, Mandi L, Ouazzani N. Removal of organic pollutants and nutrients from olive mill wastewater by a sand filter. Journal of environmental management 2009; 90: 2771-2779.

Aly Y H, Liu, C, McInnis D P, Lyon B A, Hatton J, McCarty M, & Simcik M F (2018). In situ remediation method for enhanced sorption of perfluoro-alkyl substances onto Ottawa sand. Journal of Environmental Engineering, 144 (9), 04018086.

Appleman, T D, Eric R V, Dickenson C B, Higgins C P (2013) Nanofiltration and granular activated carbon treatment of perfluoroalkyl acids. Journal of Hazardous Materials 260:740-746.

Aslam M (2019) Introducing Kolmogorov-Smirnov tests under uncertainty: an application to radioactive data. ACS Omega 5: 914-917.

Belkouteb N, Franke V, McCleaf P, Kohler S, Ahrens L (2020) Removal of per- and polyfluoroalkyl substances (PFASs) in a full-scale drinking water treatment plant: Long-term performance of granular activated carbon (GAC) and influence of flow-rate. Water Research 182: 115913.

Bell A M, Backhouse D J, Deng W, Eales J D, Kilinc E, Love K, Rautiyal P, Rigby J C, Stone A H, Vaishnav S (2020) X-Ray fluorescence analysis of feldspars and silicate glass: effects of melting time on fused bead consistency and volatilisation. Minerals 10(5), 442.

Besis A, Botsaropoulou E, Samara C, Katsoyiannis A, Hanssen L, Huber S (2019) Perfluoroalkyl substances (PFASs) in air-conditioner filter dust of indoor microenvironments in Greece: Implications for exposure. Ecotoxicology and Environmental Safety 183: 109559.

Bhavsar S P, Fowler C, Day S, Petro S, Gandhi N, Gewurtz S B, et al. (2016) High levels, partitioning and fish consumption based water guidelines of perfluoroalkyl acids downstream of a former firefighting training facility in Canada. Environment International 94: 415-423.

Bohart G S, Adams E Q. (1920) Some aspects of the behavior of charcoal with respect to chlorine. Journal of the Franklin Institute-Engineering and Applied Mathematics 42: 523-529.

Boone J S, Vigo C, Boone T, Byrne C, Ferrario J, Benson R, et al. (2019) Per- and polyfluoroalkyl substances in source and treated drinking waters of the United States. Science of the Total Environment 653: 359-369.

Bossi R, Dam M, Riget F F (2015) Perfluorinated alkyl substances (PFAS) in terrestrial environments in Greenland and Faroe Islands. Chemosphere 129: 164-169.

Brewer, A., Dror, I., Berkowitz, B., & Water, T. (2020). The Mobility of Plastic Nanoparticles in Aqueous and Soil Environments: A Critical Review. ACS EST Water, 1(1), 48-57.

Bruton T A, Blum A. Proposal for coordinated health research in PFAS-contaminated communities in the United States. Environmental Health 2017; 16: 1-6.

Chang N-B, Wanielista M, Daranpob A, Xuan Z, Hossain F. New performance-based passive septic tank underground drainfield for nutrient and pathogen removal using sorption media. Environmental Engineering Science 2010; 27:469-482.

Chang N B, Wen D, McKenna A M, Wanielista M P (2018) The impact of carbon source as electron donor on composition and concentration of dissolved organic nitrogen in biosorption-activated media for stormwater and groundwater co-treatment. Environmental Science & Technology 52:9380-9390.

Chen, H., Reinhard, M., Nguyen, T. V., You, L., He, Y., & Gin, K. Y. H. (2017). Characterization of occurrence, sources and sinks of perfluoroalkyl and polyfluoroalkyl substances (PFASs) in a tropical urban catchment. Environmental Pollution, 227, 397-405.

Chittoo B S and Sutherland C (2020) Column breakthrough studies for the removal and recovery of phosphate by lime-iron sludge: Modeling and optimization using artificial neural network and adaptive neuro-fuzzy inference system. Chinese Journal of Chemical Engineering 28(7): 1847-1859.

Chowdhury Z Z, Abd Hamid S B, Zain S M (2015) Evaluating design parameters for breakthrough curve analysis and kinetics of fixed bed columns for Cu (II) cations using lignocellulosic wastes. BioResources 10:732-749.

Chu K H (2010) Fixed bed sorption: setting the record straight on the Bohart-Adams and Thomas models. Journal of Hazardous Materials 177(1-3):1006-1012.

Chu K H, Kim E Y, and Feng X (2011) Batch kinetics of metal biosorption: Application of the Bohart-Adams rate law. Separation Science and Technology 46(10):1591-1601.

Chu, K. H. (2020) Breakthrough curve analysis by simplistic models of fixed bed adsorption: In defense of the century-old Bohart-Adams model. Chemical Engineering Journal 380, 122513.

Clara M, Gans O, Weiss S, Sanz-Escribano D, Scharf S, Scheffknecht C (2009) Perfluorinated alkylated substances in the aquatic environment: an Austrian case study. Water Research 43: 4760-4768.

Crittenden, J. C., Hutzler, N. J., Geyer, D. G., Oravitz, J. L., Friedman, G., 1986. Model development and parameter sensitivity. Water Resources Research 22(3), 271-284.

Cui D, Li X, Quinete N. (2020) Occurrence, fate, sources and toxicity of PFAS: What we know so far in Florida and major gaps. TrAC Trends in Analytical Chemistry 115976.

Davis J G, Whiting D. Choosing a soil amendment. Colorado State University. Libraries, 2000.

Deng S, Yu Q, Huang J, Yu G (2010) Removal of perfluorooctane sulfonate from wastewater by anion exchange resins: Effects of resin properties and solution chemistry. Water Research 44: 5188-5195.

Diels L, Spaans P, Van Roy S, Hooyberghs L, Ryngaert A, Wouters H, et al. (2003) Heavy metals removal by sand filters inoculated with metal sorbing and precipitating bacteria. Hydrometallurgy 71: 235-241.

Dixit, F., Dutta, R., Barbeau, B., Berube, P. and Mohseni, M. (2021) PFAS removal by ion exchange resins: A review. Chemosphere, 272, 129777.

Du Z, Deng S, Chen Y, Wang B, Huang J, Wang Y, et al. (2015) Removal of perfluorinated carboxylates from washing wastewater of perfluorooctanesulfonyl fluoride using activated carbons and resins. Journal of Hazardous Materials 286: 136-143.

FDEP DEP's Efforts to Address PFAS in the Environment. 2021.

Gagliano E, Sgroi M, Falciglia P P, Vagliasindi F G, Roccaro P (2020) Removal of poly- and perfluoroalkyl substances (PFAS) from water by adsorption: Role of PFAS chain length, effect of organic matter and challenges in adsorbent regeneration. Water Research 171: 115381.

Ghorbani A and Fakhariyan A (2013) Recovery of Al2O3, Fe2O3 and TiO2 from bauxite processing waste (red mud) by using combination of different acids. Journal of Basic and Applied Scientific Research 3(1), 187-191.

Glüge J, Scheringer M, Cousins I T, DeWitt J C. Goldenman G, Herzke D, . . . & Wang Z (2020) An overview of the uses of per- and polyfluoroalkyl substances (PFAS). Environmental Science: Processes & Impacts 22(12), 2345-2373.

Gong Z, Li S, Ma J, Zhang X (2016) Self-flocculated powdered activated carbon with different oxidation methods and their influence on adsorption behavior. Journal of Hazardous Materials 304: 222-232.

González-López, M. E., Laureano-Anzaldo, C. M., Perez-Fonseca, A. A., Arellano, M. and Robledo-Ortíz, J. R. (2021) A Critical Overview of Adsorption Models Linearization: Methodological and Statistical Inconsistencies. Separation & Purification Reviews, 1-15.

Greenlee L F, Torrey J D, Amaro R L, Shaw J M (2012) Kinetics of zero valent iron nanoparticle oxidation in oxygenated water. Environmental Science & Technology 46(23):12913-20.

Gullett B, Gillespie A (2020) Per- and Polyfluoroalkyl Substances (PFAS): Incineration to Manage PFAS Waste Streams. US EPA Technical Brief 2020.

Hashim M and Chu K (2007) Prediction of protein breakthrough behavior using simplified analytical solutions. Separation & purification technology 53(2), 189-197.

Hellsing M S, Josefsson S, Hughes A V, Ahrens L (2016) Sorption of perfluoroalkyl substances to two types of minerals. Chemosphere 159: 385-391.

Hepburn E, Madden C, Szabo D, Coggan T L, Clarke B, Currell M (2019) Contamination of groundwater with per- and polyfluoroalkyl substances (PFAS) from legacy landfills in an urban re-development precinct. Environmental Pollution 248: 101-113.

Hori H, Hayakawa E, Einaga H, Kutsuna S, Koike K, Ibusuki T, Kiatagawa H, Arakawa R. (2004) Decomposition of environmentally persistent perfluorooctanoic acid in water by photochemical approaches. Environmental Science & Technology 8(22):6118-24.

Hori H, Yamamoto A, Hayakawa E, Taniyasu S, Yamashita N, Kutsuna S, Kiatagawa H, Arakawa R. (2005) Efficient decomposition of environmentally persistent perfluorocarboxylic acids by use of persulfate as a photochemical oxidant. Environmental Science & Technology 39(7): 2383-8.

Hori H, Yamamoto A, Koike K, Kutsuna S, Osaka I, Arakawa R. (2007) Photochemical decomposition of environmentally persistent short-chain perfluorocarboxylic acids in water mediated by iron (II)/(III) redox reactions. Chemosphere 68(3):572-8.

Hu Q, Xie Y, Zhang Z (2020) Modification of breakthrough models in a continuous-flow fixed-bed column: mathematical characteristics of breakthrough curves and rate profiles. Separation and Purification Technology 238: 116399.

IPEN (2019) PFAS Pollution Across The Middle East and Asia.

Jensen A A, Leffers H (2008) Emerging endocrine disrupters: perfluoroalkylated substances. International Journal of Andrology 31: 161-169.

Jeon J, Kannan K, Lim B J, An K G, Kim S D (2011) Effects of salinity and organic matter on the partitioning of perfluoroalkyl acid (PFAs) to clay particles. Journal of Environmental Monitoring 13:1803-1810.

Jiang S, Li Y, Ladewig B P (2017) A review of reverse osmosis membrane fouling and control strategies. Science of The Total Environment, 595, pp. 567-583.

Johnson R L, Anschutz A J, Smolen J M, Simcik M F, Penn R L (2007) The adsorption of perfluorooctane sulfonate onto sand, clay, and iron oxide surfaces. Journal of Chemical & Engineering Data, 52 (4):1165-1170.

Jones J, Chang N B, and Wanielista M (2015) Reliability analysis of phosphorus removal efficiencies of stormwater runoff with green sorption media under varying influent conditions. Science of the Total Environment 502(1):434-447.

Jones A, Knocke W (2017) Evaluating the role of soluble aluminum in manganese removal via MnOx (s)-coated filtration media in drinking water treatment. Water Research 111: 59-65.

Joo S H, Feitz A J, Waite T D (2004) Oxidative degradation of the carbothioate herbicide, molinate, using nanoscale zero-valent iron. Environmental Science & Technology 38(7), 2242-2247.

Keenan C R and Sedlak D L (2008) Factors affecting the yield of oxidants from the reaction of nanoparticulate zero-valent iron and oxygen. Environmental Science & Technology 42(4), 1262-1267.

Keselj D, Lazic D, Penavin-Skundric J, Sladojevic S and Vasiljevic L (2012) Determination of Alumina Oxide in Bauxites by X-Ray Fluorescence Analysis. Global Journal of Science Frontier Research Chemistry 12.

Kempnaers L, (2020) The Basics of Elemental Analysis with XRF—Q&A. Malvern Panalytical.

Kim M, Li L Y, Grace J R, Yue C (2015) Selecting reliable physicochemical properties of perfluoroalkyl and polyfluoroalkyl substances (PFASs) based on molecular descriptors. Environmental Pollution 196: 462-472.

Kim S K, Kannan K. (2007) Perfluorinated acids in air, rain, snow, surface runoff, and lakes: relative importance of pathways to contamination of urban lakes. Environmental Science & Technology 41: 8328-8334.

Kolmogorov A. (1933) Sulla determinazione empirica di una lgge di distribuzione. Inst. Ital. Attuari, Giorn. 4: 83-91.

Kovalev M S, Utkin L V (2020) A robust algorithm for explaining unreliable machine learning survival models using the Kolmogorov-Smirnov bounds. Neural Networks 132: 1-18.

Kucharzyk K H, Darlington R, Benotti M, Deeb R, Hawley E (2017) Novel treatment technologies for PFAS compounds: A critical review. Journal of Environmental Management 204:757-764.

Kumar M, Borah P, Devi P (2020) Priority and emerging pollutants in water. Inorganic Pollutants in Water. Elsevier, pp. 33-49.

Lanzante J R (2021) Testing for differences between two distributions in the presence of serial correlation using the Kolmogorov-Smirnov and Kuiper's tests. International Journal of Climatology. DOI: 10.1002/joc.7196

Le, S.-T., Kibbey, T. C., Weber, K. P., Glamore, W. C., O'Carroll, D. M. (2021) A group-contribution model for predicting the physicochemical behavior of PFAS components for understanding environmental fate. Science of The Total Environment 764, 142882.

Lee Y M, Lee J Y, Kim M K, Yang H, Lee J E, Son Y, et al. (2020) Concentration and distribution of per- and polyfluoroalkyl substances (PFAS) in the Asan Lake area of South Korea. Journal of Hazardous Materials 381: 120909.

Leutnant D, Muschalla D, Uhl M (2018) Distribution-based calibration of a stormwater quality model. Water 10: 1027.

Liu L, Luo X B, Ding L, Luo S L (2019) Application of nanotechnology in the removal of heavy metal from water. Nanomaterials for the removal of pollutants and resource reutilization. Elsevier, pp. 83-147, edited by Xubiao Luo Fang Deng, Elsevier, Amsterdam, Netherlands.

Liu J, Weinholtz L, Zheng L, Peiravi M, Wu Y, Chen D (2017) Removal of PFOA in groundwater by $Fe^0$ and $MnO_2$ nanoparticles under visible light. Journal of Environmental Science and Health, Part A, 52(11), 1048-1054.

Lopes R H, Reid I, Hobson P R (2007) The two-dimensional Kolmogorov-Smirnov test. Proceedings of Science, XI International Workshop on Advanced Computing and Analysis Techniques in Physics Research, Nikhef, Amsterdam, the Netherlands, Apr. 23-27, 2007.

Luiz A J B (2021) Application of the Kolmogorov-Smirnov Test to compare greenhouse gas emissions over time. Revista Brasileira De Biometria 39: 60-70.

Maine Environmental Laboratory (2021) Biochemical Oxygen Demand (BOD) and CBOD.

MN/9, C. (1997) Part 7: Determination of trace elements-Wavelength dispersive X-ray fluorescence spectrometric method.

Mastropietro T, Bruno R, Pardo E, Armentano D. (2021) Reverse osmosis and nanofiltration membranes for highly efficient PFASs removal: overview, challenges and future perspectives. Dalton Transactions 50(16), 5398-5410.

Matamoros V, Arias C, Brix H, Bayona J M (2007) Removal of pharmaceuticals and personal care products (PPCPs) from urban wastewater in a pilot vertical flow constructed wetland and a sand filter. Environmental Science & Technology 41: 8171-8177.

Mittler B, Turner J (2017) Adopted Total Maximum Daily Loads (Tmdls) In Florida—Chapter 62-304, Florida Administrative Code. December 2016.

Morr S, Cuartas E, Alwattar B, Lane J M (2006) How much calcium is in your drinking water? A survey of calcium concentrations in bottled and tap water and their significance for medical treatment and drug administration. HSS Journal 2: 130-135.

Murray C C, Vatankhah H, McDonough C A, Nickerson A, Hedtke T T, Cath T Y, et al. (2019) Removal of per- and polyfluoroalkyl substances using super-fine powder activated carbon and ceramic membrane filtration. Journal of Hazardous Materials 366:160-168.

NIH (2021) Perfluoroalkyl and Polyfluoroalkyl Substances (PFAS), National Institute of Environmental Health Sciences. https://www.niehs.nih.gov/health/topics/agents/pfc/index.cfm accessed by October 2021.

National Resources Conservation Services (NRCS) (2021) Soil Bulk Density/Moisture/Aeration. USDA, https://www.nres.usda.gov/Internet/FSE_DOCUMENTS/nrcs142p2_053260.pdf, accessed by October 2021.

O'Reilly A M, Wanielista M P, Chang N-B, Xuan Z, Harris W G. Nutrient removal using biosorption activated media: Preliminary biogeochemical assessment of an innovative stormwater infiltration basin. Science of the Total Environment 2012; 432: 227-242.

Ochoa-Herrera V, Sierra-Alvarez R. Removal of perfluorinated surfactants by sorption onto granular activated carbon, zeolite and sludge. Chemosphere 2008; 72: 1588-1593.

Ordonez, D., Valencia, A., Chang, N. B., & Wanielista, M. P. (2020). Synergistic effects of aluminum/iron oxides and clay minerals on nutrient removal and recovery in water filtration media. Journal of Cleaner Production, 275, 122728.

Parenky A C, Gevaerd de Souza N, Asgari P, Jeon J, Nadagouda M N, Choi H. Removal of perfluorooctanesulfonic acid in water by combining zerovalent iron particles with common oxidants. Environmental Engineering Science. 2020 Jul. 1; 37(7):472-81.

Park M, Wu S, Lopez I J, Chang J Y, Karanfil T, Snyder S A (2020) Adsorption of perfluoroalkyl substances (PFAS) in groundwater by granular activated carbons: Roles of hydrophobicity of PFAS and carbon characteristics. Water Research 170:115364.

Park S, Zenobio, J E, Lee, L S (2018) Perfluorooctane sulfonate (PFOS) removal with $Pd^0/nFe^0$ nanoparticles: Adsorption or aqueous Fe-complexation, not transformation? J. Hazard. Mater. 342 (Supplement C), 20-28.

Patel, H. (2019) Fixed-bed column adsorption study: a comprehensive review. Applied Water Science 9(3):1-17.

Paul V J (2008) Global warming and cyanobacterial harmful algal blooms. In: Hudnell H. K. (eds) Cyanobacterial Harmful Algal Blooms: State of the Science and Research Needs. Advances in Experimental Medicine and Biology, vol 619. Springer, New York, NY.

Podder A, Sadmani A A, Reinhart D, Chang N-b, Goel R (2021) Per and polyfluoroalkyl substances (PFAS) as a contaminant of emerging concern in surface water: A transboundary review of their occurrences and toxicity effects. Journal of Hazardous Materials 126361.

Post G B, Cohn P D, Cooper K R (2012) Perfluorooctanoic acid (PFOA), an emerging drinking water contaminant: a critical review of recent literature. Environmental Research 116:93-117.

Recepoğlu Y K, Kabay N, Ipek I Y, Arda M, Yüksel M, Yoshizuka K, et al. (2018) Packed bed column dynamic study for boron removal from geothermal brine by a chelating fiber and breakthrough curve analysis by using mathematical models. Desalination 437: 1-6.

Rostvall A, Zhang W, Dürig W, Renman G, Wiberg K, Ahrens L, et al. (2018) Removal of pharmaceuticals, perfluoroalkyl substances and other micropollutants from wastewater using lignite, Xylit, sand, granular activated carbon (GAC) and GAC+ Polonite® in column tests-Role of physicochemical properties. Water Research 137:97-106.

Sadmani A H M A, Andrews R C, Bagley, D M (2014) Rejection of pharmaceutically active and endocrine disrupting compounds by nanofiltration as a function of source water humic substances. Journal of Water Process Engineering, 2(0):63-70.

Sari R K (2019) Analysis of oxide content in sand and rock found in public mining of west sumatra province using XRF test, p. 012055, IOP Publishing.

Schedin E (2013) Effect of organic carbon, active carbon, calcium ions and aging on the sorption of per- and polyfluoroalkylated substances (PFASs) to soil. Department of Aquatic Sciences and Assessment at the Swedish University of Agricultural Sciences. Master in Environmental and Aquatic Civil Engineering. Uppsala University, pp. 57.

Scicchitano P (2019) Toxic PFAS Chemical Found In Florida Here's Where. Patch.

Shanmugam D, Alagappan M, Rajan R K (2016) Bench-scale packed bed sorption of Cibacron blue F3GA using lucrative algal biomass. Alexandria Engineering Journal 55(3): 2995-3003.

Simon J A, Abrams S, Bradburne T, Bryant D, Burns M, Cassidy D, et al. (2019) PFAS Experts Symposium: Statements on regulatory policy, chemistry and analytics, toxicology, transport/fate, and remediation for per- and polyfluoroalkyl substances (PFAS) contamination issues. Remediation Journal 29:31-48.

Simsek E B, Beker U, Senkal B F (2014) Predicting the dynamics and performance of selective polymeric resins in a fixed bed system for boron removal. Desalination 349:39-50.

Singh A, Kumar D, Gaur, J. á. (2012) Continuous metal removal from solution and industrial effluents using Spirogyra biomass-packed column reactor. Water Research 46(3):779-788.

Smirnov N (1948) Table for estimating the goodness of fit of empirical distributions. The Annals of Mathematical Statistics 19:279-281.

Sörengård M, Östblom E, Köhler S, Ahrens L. (2020) Adsorption behavior of per- and polyfluoralkyl substances (PFASs) to 44 inorganic and organic sorbents and use of dyes as proxies for PFAS sorption. Journal of Environmental Chemical Engineering 8:103744.

Stoiber T, Evans S, Naidenko O (2020) Disposal of products and materials containing per- and polyfluoroalkyl substances (PFAS): A cyclical problem. Chemosphere 260: 127659-127659.

Tang C Y, Fu Q S, Gao D, Criddle C S, Leckie J O (2010) Effect of solution chemistry on the adsorption of perfluorooctane sulfonate onto mineral surfaces. Water research 44: 2654-2662.

Thomas H C (1944) Heterogeneous ion exchange in a flowing system. Journal of the American Chemical Society 66:1664-1666.

Turner, A. and Rawling, M. C. (2001) The influence of salting out on the sorption of neutral organic compounds in estuaries. Water Research 35(18), 4379-4389.

Umembamalu C J, Igwegbe, C A, Osuagwu E U, Nwabanne J T (2020) Packed bed column adsorption of oil and grease from refinery desalter effluent, using rice husks derived carbon as the adsorbent: Influence of process parameters and Bohart-Adams kinetics study. World News of Natural Sciences 31, 155-174.

UN WWDR TUNWWDR (2017) The United Nations World Water Development Report In: UNESCO WWAP, editor.

USEPA (2019) Determination of Selected Perfluorinated Alkyl Acids in Drinking Water by Solid Phase Extraction and Liquid Chromatography/Tandem Mass Spectrometry (LC/MS/MS), EPA Method 537. Version 1.1. In: U.S. Environmental Protection Agency, editor.

USEPA (2016) Drinking Water Health Advisories for PFOA and PFOS. In: U.S. Environmental Protection Agency, editor.

Valencia A, Chang N B, Wen D, Ordonez D, Wanielista M P (2019a) Optimal recipe assessment of iron filing-based green environmental media for improving nutrient removal in stormwater runoff. Environmental Engineering Science 36: 1323-1336.

Valencia A, Kilner J, Chang N B, Wanielista M P (2019b) Chemophysical evaluation of green sorption media for copper removal in stormwater runoff for improving ecosystem and human health. Water, Air, & Soil Pollution 230: 2.

Verma S, Daverey A, Sharma A (2017) Slow sand filtration for water and wastewater treatment—a review. Environmental Technology Reviews 6: 47-58.

Viberg H and Eriksson P (2017) Reproductive and Developmental Toxicology, pp. 811-827, Elsevier.

Wagner C, Adrian R. (2009) Cyanobacteria dominance: quantifying the effects of climate change. Limnology and Oceanography 54: 2460-2468.

Wang F, Lu X, Shih K, Liu C (2011) Influence of calcium hydroxide on the fate of perfluorooctanesulfonate under thermal conditions. Journal of Hazardous Materials 192: 1067-1071.

Wang F, Shih K. (2011) Adsorption of perfluorooctanesulfonate (PFOS) and perfluorooctanoate (PFOA) on alumina: Influence of solution pH and cations. Water Research 45: 2925-2930.

Wang M, Orr A A, Jakubowski J M, Bird K E, Casey C M, Hearon S E, et al. (2021) Enhanced adsorption of per- and polyfluoroalkyl substances (PFAS) by edible, nutrient-amended montmorillonite clays. Water Research 188: 116534.

Wang F, Lu X, Li X-y, Shih K (2015a) Effectiveness and mechanisms of defluorination of perfluorinated alkyl substances by calcium compounds during waste thermal treatment. Environmental Science and Technology 49: 5672-5680.

Wang T, Zhao C, Li P, Li Y, Wang J (2015b) Fabrication of novel poly (m-phenylene isophthalamide) hollow fiber nanofiltration membrane for effective removal of trace amount perfluorooctane sulfonate from water. Journal of Membrane Science 477: 74-85.

Wen D, Chang N-B, Wanielista M P (2018) Comparative copper toxicity impact and enzymatic cascade effect on biosorption activated media and woodchips for nutrient removal in stormwater treatment. Chemosphere 213: 403-413.

Wen D, Valencia A, Ordonez D, Chang N B, Wanielista M (2020) Comparative nitrogen removal via microbial ecology between soil and green sorption media in a rapid infiltration basin for co-disposal of stormwater and wastewater. Environmental Research 184: 109338.

Wolborska A (1989) Adsorption on activated carbon of p-nitrophenol from aqueous solution. Water Research 23: 85-91.

Woodard S, Berry J, Newman B. (2017) Ion exchange resin for PFAS removal and pilot test comparison to GAC. Remediation Journal 27:19-27.

Wu, X., Lyu, X., Li, Z., Gao, B., Zeng, X., Wu, J., & Sun, Y. (2020). Transport of polystyrene nanoplastics in natural soils: Effect of soil properties, ionic strength and cation type. Science of the Total Environment, 707, 136065.

Xiao F, Zhang X, Penn L, Gulliver J S, Simcik M F (2011) Effects of monovalent cations on the competitive adsorption of perfluoroalkyl acids by kaolinite: experimental studies and modeling. Environmental Science & Technology 45: 10028-10035.

Xu, Z., Cai, J.-g. and Pan, B.-c. (2013) Mathematically modeling fixed-bed adsorption in aqueous systems. Journal of Zhejiang University SCIENCE A 14(3), 155-176.

Yan G, Viraraghavan T, Chen M (2001) A new model for heavy metal removal in a biosorption column. Adsorption Science & Technology 19: 25-43.

Yang S, Zhang K, Fang Z (2020) Robust RNA-seq data analysis using an integrated method of ROC curve and Kolmogorov-Smirnov test. Communications in Statistics-Simulation and Computation 1-14.

Ying, A., Evans, S. F., Tsouris, C. and Paranthaman, M. P. (2020) Magnetic Sorbent for the Removal of Selenium (IV) from Simulated Industrial Wastewaters: Determination of Column Kinetic Parameters. Water 12(5), 1234.

Yoon Y H, Nelson J H (1984) Application of gas adsorption kinetics I. A theoretical model for respirator cartridge service life. American Industrial Hygiene Association Journal 45: 509-516.

You, C., Jia, C. and Pan, G. (2010) Effect of salinity and sediment characteristics on the sorption and desorption of perfluorooctane sulfonate at sediment-water interface. Environmental pollution 158(5), 1343-1347.

Zhang Z, Sarkar D, Datta R, Deng Y (2021) Adsorption of Perfluorooctanoic Acid (PFOA) and Perfluorooctanesulfonic Acid (PFOS) by Aluminum-based Drinking Water Treatment Residuals. Journal of Hazardous Materials Letters 100034.

Zhao C, Zhang J, He G, Wang T, Hou D, Luan Z. (2013) Perfluorooctane sulfonate removal by nanofiltration membrane: the role of calcium ions. Chemical Engineering Journal 233: 224-232.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of treating water containing one or more per- or polyfluoroalkyl substances, the method comprising the steps of:
mixing together a composition of zero-valent iron particles, clay particles, and sand particles to generate a fixed bed filter including the composition;
flowing an amount of water containing one or more per- or polyfluoroalkyl substances through the fixed bed filter including the composition;
during flowing the amount of water through the fixed bed filter, via the zero-valent iron particles of the composition, oxidizing the one or more per- or polyfluoroalkyl substances of the amount of water to generate at least one fluorinated carbon group and an oxidation-reaction-induced byproduct, the oxidation-reaction-induced byproduct including a portion of the one or more per- or polyfluoroalkyl substances, such that the oxidation-reaction-induced byproduct has a length smaller than a length of each of the one or more per- or polyfluoroalkyl substances;
during flowing the amount of water through the fixed bed filter, via a hydrophilic film surrounding the zero-valent iron particles, adsorbing an amount of the one or more per- or polyfluoroalkyl substances of the oxidation-reaction-induced byproduct; and during flowing the amount of water through the fixed bed filter, via the zero-valent iron particles and the clay particles, adsorbing an amount of the one or more per- or polyfluoroalkyl substances of the oxidation-reaction-induced byproduct, wherein the zero-valent iron particles, the clay particles, and the sand particles synergistically remove the one or more per- or polyfluoroalkyl substances from the water.

2. The method of claim 1, wherein the composition includes at most 5% (v/v) zero-valent iron particles.

3. The method of claim 1, wherein the composition includes approximately 4% (v/v) clay particles.

4. The method of claim 1, wherein the composition includes approximately 91% (v/v) sand particles.

5. The method of claim 1, wherein the composition includes at most 5% (v/v) zero-valent iron particles, approximately 4% (v/v) clay particles, and approximately 91% (v/v) sand particles.

6. The method of claim 1, wherein the zero-valent iron particles are in a powder format.

7. The method of claim 1, wherein the one or more per- or polyfluoroalkyl substances is selected from the group consisting of perfluorooctane sulfonic acid and perfluorooctanoic acid.

* * * * *